US008949884B2

(12) United States Patent
Okubo et al.

(10) Patent No.: US 8,949,884 B2
(45) Date of Patent: Feb. 3, 2015

(54) BROADCAST RECEIVING APPARATUS, BROADCAST RECEIVING METHOD, AND PROGRAM

(71) Applicant: Panasonic Intellectual Property Corporation of America, Torrance, CA (US)

(72) Inventors: Masafumi Okubo, Kyoto (JP); Tomonori Nakamura, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 13/988,912

(22) PCT Filed: Oct. 9, 2012

(86) PCT No.: PCT/JP2012/006457
§ 371 (c)(1),
(2) Date: May 22, 2013

(87) PCT Pub. No.: WO2013/061526
PCT Pub. Date: May 2, 2013

(65) Prior Publication Data
US 2014/0059590 A1     Feb. 27, 2014

(30) Foreign Application Priority Data

Oct. 26, 2011  (JP) .................................. 2011-235161

(51) Int. Cl.
*H04N 7/10*  (2006.01)
*H04N 7/025*  (2006.01)
(Continued)

(52) U.S. Cl.
CPC ................. *H04N 21/43* (2013.01); *H04N 5/45* (2013.01); *H04N 21/4316* (2013.01);
(Continued)

(58) Field of Classification Search
CPC .................. H04N 21/4316; H04N 21/440263; H04N 21/4622; H04N 21/43; H04N 21/6175; H04N 21/6125; H04N 5/45; H04N 5/44504; H04N 13/0059
See application file for complete search history.

(56) References Cited

U.S. PATENT DOCUMENTS 7,168,051 B2   1/2007  Robinson et al.
7,898,600 B2   3/2011  Lee et al.
(Continued)

FOREIGN PATENT DOCUMENTS

JP   2002-262246   9/2002
JP   2004-235734   8/2004
(Continued)

OTHER PUBLICATIONS

International Search Report issued Dec. 25, 2012 in corresponding International Application No. PCT/JP2012/006457.

*Primary Examiner* — Jefferey Harold
*Assistant Examiner* — Sean Haiem
(74) *Attorney, Agent, or Firm* — Wenderoth, Lind & Ponack, L.L.P.

(57) ABSTRACT

A broadcast receiving apparatus capable of changing a layout of broadcast and communication content items includes: a communication content item receiving unit receiving the communication content item distributed through communication; a broadcast content item receiving unit receiving the broadcast content item; a plane for holding a picture of a broadcast video represented by the broadcast content item, and a picture of a communication video represented by the communication content item; a layout information obtaining unit obtaining layout information indicating a layout of the broadcast and communication videos; and a superimposing unit superimposing the picture of the broadcast video and the picture of the communication video held in the plane, according to the layout information for each set of the pictures, and outputting an image in which the picture of the broadcast video and the picture of the communication video are superimposed.

20 Claims, 26 Drawing Sheets

(51) Int. Cl.
*H04N 7/173* (2011.01)
*G09G 5/00* (2006.01)
*H04N 5/445* (2011.01)
*H04N 21/43* (2011.01)
*H04N 5/45* (2011.01)
*H04N 21/431* (2011.01)
*H04N 21/4402* (2011.01)
*H04N 21/462* (2011.01)
*H04N 21/61* (2011.01)
*H04N 13/00* (2006.01)

(52) U.S. Cl.
CPC .. *H04N 21/440263* (2013.01); *H04N 21/4622* (2013.01); *H04N 21/6125* (2013.01); *H04N 21/6175* (2013.01); *H04N 5/44504* (2013.01); *H04N 13/0059* (2013.01)
USPC .............. 725/32; 725/39; 725/117; 345/619; 348/564

(56) References Cited

U.S. PATENT DOCUMENTS

| | | | |
|---|---|---|---|
| 7,903,176 B2 | 3/2011 | Lee et al. | |
| 8,013,937 B2 | 9/2011 | Lee et al. | |
| 8,046,706 B2 | 10/2011 | Lee et al. | |
| 8,046,709 B2 | 10/2011 | Lee et al. | |
| 8,054,319 B2 | 11/2011 | Lee et al. | |
| 8,095,887 B2 | 1/2012 | Lee et al. | |
| 8,117,281 B2 | 2/2012 | Robinson et al. | |
| 8,174,617 B2 | 5/2012 | Lee et al. | |
| 8,189,108 B2 | 5/2012 | Lee et al. | |
| 8,208,072 B2 | 6/2012 | Lee et al. | |
| 8,234,218 B2 | 7/2012 | Robinson et al. | |
| 8,243,198 B2 | 8/2012 | Lee et al. | |
| 8,244,830 B2 | 8/2012 | Robinson et al. | |
| 8,316,450 B2 | 11/2012 | Robinson et al. | |
| 8,356,077 B2 | 1/2013 | Robinson et al. | |
| 2002/0113820 A1 | 8/2002 | Robinson et al. | |
| 2002/0122138 A1* | 9/2002 | Fukuda | 348/564 |
| 2007/0005969 A1 | 2/2007 | Lee et al. | |
| 2007/0030263 A1 | 2/2007 | Lee et al. | |
| 2007/0030289 A1 | 2/2007 | Lee et al. | |
| 2007/0030389 A1 | 2/2007 | Lee et al. | |
| 2007/0030390 A1 | 2/2007 | Lee et al. | |
| 2007/0030393 A1 | 2/2007 | Lee et al. | |
| 2007/0030394 A1 | 2/2007 | Lee et al. | |
| 2007/0030395 A1 | 2/2007 | Lee et al. | |
| 2007/0035469 A1 | 2/2007 | Lee et al. | |
| 2007/0035470 A1 | 2/2007 | Lee et al. | |
| 2007/0035471 A1 | 2/2007 | Lee et al. | |
| 2007/0035560 A1 | 2/2007 | Lee et al. | |
| 2007/0050833 A1* | 3/2007 | Park | 725/117 |
| 2007/0052855 A1 | 3/2007 | Lee et al. | |
| 2007/0055946 A1 | 3/2007 | Lee et al. | |
| 2008/0088744 A1 | 4/2008 | Lee et al. | |
| 2008/0094415 A1 | 4/2008 | Lee et al. | |
| 2008/0094508 A1 | 4/2008 | Lee et al. | |
| 2008/0094509 A1 | 4/2008 | Lee et al. | |
| 2008/0094510 A1 | 4/2008 | Lee et al. | |
| 2008/0094511 A1 | 4/2008 | Lee et al. | |
| 2008/0094512 A1 | 4/2008 | Lee et al. | |
| 2008/0094513 A1 | 4/2008 | Lee et al. | |
| 2008/0098402 A1 | 4/2008 | Lee et al. | |
| 2008/0106487 A1 | 5/2008 | Lee et al. | |
| 2008/0106533 A1 | 5/2008 | Lee et al. | |
| 2008/0106645 A1 | 5/2008 | Lee et al. | |
| 2008/0109725 A1 | 5/2008 | Lee et al. | |
| 2008/0163379 A1 | 7/2008 | Robinson et al. | |
| 2008/0222295 A1 | 9/2008 | Robinson et al. | |
| 2009/0122079 A1* | 5/2009 | Nishioka | 345/619 |
| 2009/0147139 A1* | 6/2009 | Watanabe et al. | 348/564 |
| 2009/0165140 A1 | 6/2009 | Robinson et al. | |
| 2009/0249393 A1* | 10/2009 | Shelton et al. | 725/39 |
| 2009/0310021 A1* | 12/2009 | Kondo et al. | 348/564 |
| 2009/0322714 A1 | 12/2009 | Lee et al. | |
| 2010/0259679 A1 | 10/2010 | Watanabe et al. | |
| 2010/0259680 A1 | 10/2010 | Watanabe et al. | |
| 2010/0259681 A1 | 10/2010 | Watanabe et al. | |
| 2010/0260478 A1 | 10/2010 | Watanabe et al. | |
| 2010/0260479 A1 | 10/2010 | Watanabe et al. | |
| 2011/0219419 A1* | 9/2011 | Reisman | 725/112 |
| 2012/0124486 A1 | 5/2012 | Robinson et al. | |
| 2012/0278740 A1 | 11/2012 | Robinson et al. | |

FOREIGN PATENT DOCUMENTS

| | | |
|---|---|---|
| JP | 2005-26867 | 1/2005 |
| JP | 2006-333101 | 12/2006 |
| JP | 2007-68172 | 3/2007 |
| JP | 2007-33946 | 8/2007 |
| JP | 2007-243903 | 9/2007 |
| JP | 2009-503602 | 1/2009 |
| JP | 2009-303062 | 12/2009 |
| JP | 2011-120089 | 6/2011 |
| JP | 2012-205075 | 10/2012 |
| WO | 2007/018380 | 2/2007 |

* cited by examiner

FIG. 6

| | First layout (broadcast is main) | | Second layout (communication is main) | | Layout information 20a |
|---|---|---|---|---|---|
| | Display size | Display position | Display size | Display position | |
| Broadcast content item | 1920 × 1080 | (0, 0) | 320 × 180 | (960, 540) | |
| Communication content item | 320 × 180 | (960, 540) | 1920 × 1080 | (0, 0) | |

FIG. 9

| | | |
|---|---|---|
| Playback position | 0x000015F90 | Synchronization information 21 |
| Playback time | 20 : 00 | |
| Broadcast type | Video/live | |
| Still image identification information | Image.jpg | |

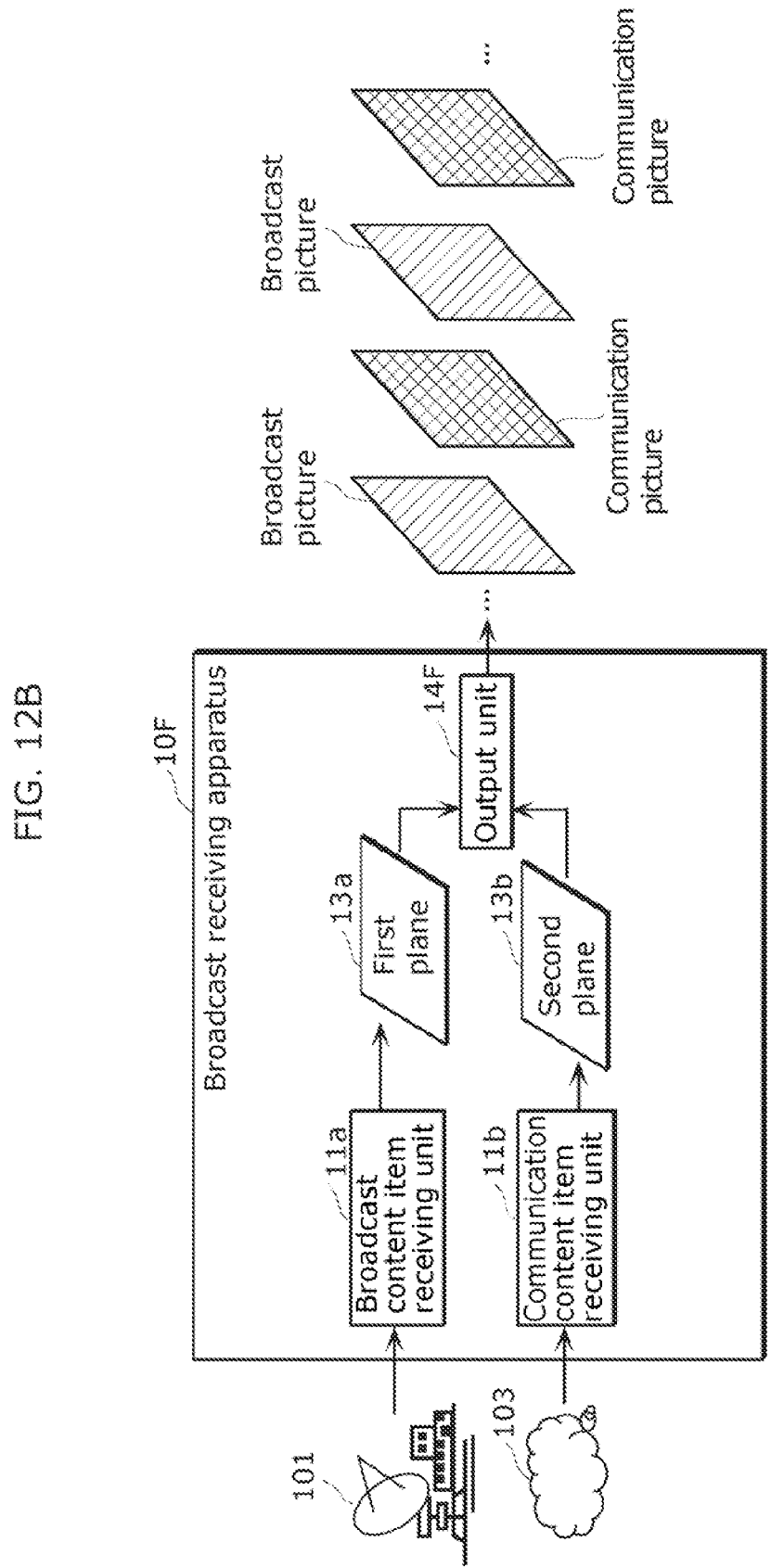

FIG. 18

| Synchronization content information item | | 321 |
|---|---|---|
| Content ID | crid://chZ.com/123 | |
| URL | http://chZ.com/123.ts | |
| Codec | MPEG2 | |
| Resolution | 1920 × 1080 | |
| Bit rate | 8 Mbps | |
| Start | Time | 20:00 |
| | PTS | 0x000015F90 |
| End | Time | 22:00 |
| | PTS | 0x101D5DC0 |
| Broadcast type | Live | |

| Synchronization content information item | |
|---|---|
| Content ID | crid://chZ.com/123 |
| URL | http://chZ.com/123.ts |
| Codec | MPEG2 |
| Resolution | 1920 × 1080 |
| Bit rate | 8 Mbps |
| Start Time | 20:00 |
| Start PTS | 0x000015F90 |
| End Time | 22:00 |
| End PTS | 0x101D5DC0 |
| Distribution type | Live |
| Interlocking data | Image.jpg 2011/6/23 20:15-20:30 |

| | Synchronization content information item | |
|---|---|---|
| 321 | Content ID | crid://chZ.com/123 |
| | URL | http://chZ.com/1231.ts |
| | Codec | MPEG2 |
| | Resolution | 1920 × 1080 |
| | Bit rate | 8 Mbps |
| | Start time | 2011/6/23 20:00 |
| | End time | 2011/6/23 22:00 |
| 1401 | Data type | Thumbnail |
| 1402 | The number of screens | 4 |
| 1403 | Video region 1 | (0,0,960,540) |
| | Video region 2 | (960,0,960,540) |
| | Video region 3 | (0,540,960,540) |
| | Video region 4 | (960,540,960,540) |

BROADCAST RECEIVING APPARATUS, BROADCAST RECEIVING METHOD, AND PROGRAM

TECHNICAL FIELD

The present invention relates to a broadcast receiving apparatus that receives a broadcast content item to be broadcast, and in particular to a broadcast receiving apparatus and others that also receive a communication content item to be distributed through communication other than broadcasting.

BACKGROUND ART

In recent years, television receivers (hereinafter referred to as TVs) capable of downloading content items using communication called "Internet television" or "smart TV" and playing back the content items are becoming mainstream (for example, see Patent Literatures (hereinafter referred to as PTLs) 1 to 3).

For example, such a TV is included in a broadcast receiving apparatus that receives a broadcast content item and is connected to the Internet. The TV searches for a video that is a desired communication content via the connected Internet, and downloads and plays back the video. Furthermore, an on-demand TV receives a content item streaming-distributed from a video/music distribution site, and plays back the content. The TV downloads and executes an application program, such as a game and a utility, and has a communication function, such as a social network service,

CITATION LIST

Patent Literature

[PTL 1] Japanese Unexamined Patent Application Publication No. 2007-68172
[PTL 2] Japanese Unexamined Patent Application Publication No. 2005-26867
[PTL 3] Japanese Unexamined Patent Application Publication (Translation of PCT Application) No. 2009-503602

SUMMARY OF INVENTION

Technical Problem

The broadcast receiving apparatuses of PTLs 1 to 3 have, however, a problem of incapability of changing a layout of a video of a broadcast content item and a video of a communication content item.

Thus, the present invention provides a broadcast receiving apparatus capable of changing the layout of the broadcast content item and the communication content item.

Solution to Problem

The broadcast receiving apparatus according to an aspect of the present invention is a broadcast receiving apparatus that receives a broadcast content item to be broadcast, and includes: a communication content item receiving unit configured to receive a communication content item that is distributed through communication other than broadcasting and is related to the broadcast content item; a broadcast content item receiving unit configured to receive the broadcast content item; a plane for holding a picture of a broadcast video that is a video represented by the broadcast content item, and a picture of a communication video that is a video represented by the communication content item; a layout information obtaining unit configured to obtain layout information from outside of the broadcast receiving apparatus, the layout information indicating a layout of the broadcast video and the communication video; and a superimposing unit configured to superimpose the picture of the broadcast video and the picture of the communication video, according to the layout information for each set of the pictures, and output an image in which the picture of the broadcast video and the picture of the communication video are superimposed, the pictures being held in the plane.

These general or specific aspects of the present invention may be implemented by a system, a method, an integrated circuit, a computer program, a computer-readable recording medium, such as a CD-ROM, or an arbitrary combination of the system, the method, the integrated circuit, the computer program, and the recording medium.

Advantageous Effects of Invention

The broadcast receiving apparatus according to the present invention can change a layout of a broadcast content item and a communication content item.

BRIEF DESCRIPTION OF DRAWINGS

FIG. 6 shows layout information according to Variation 1 of Embodiment 1.
FIG. 9 shows an example of synchronization information according to Variation 2 of Embodiment 1.
FIG. 12B illustrates a configuration of a broadcast receiving apparatus according to Variation 5 of Embodiment 1.

FIG. 18 shows an example of a synchronization content information item according to Variation 1 of Embodiment 2.

FIG. 22 shows an example of a synchronization content information item according to Variation 3 of Embodiment 2.

FIG. 24 shows an example of a synchronization content information item according to Variation 4 of Embodiment 2.

Figure 1:
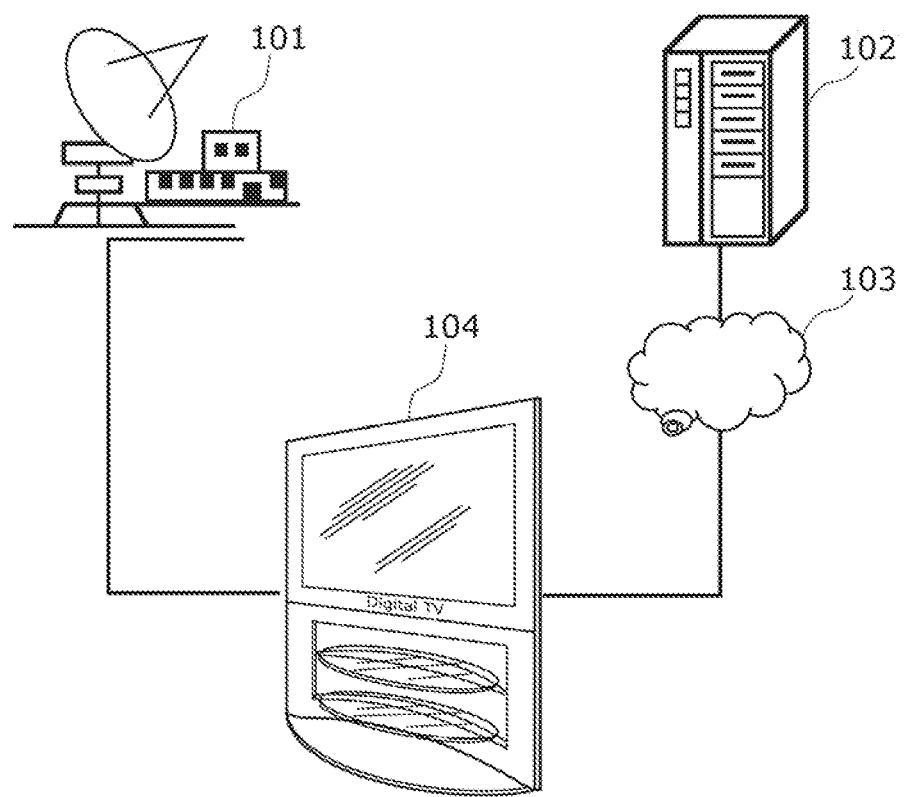
FIG. 1 illustrates a system including a TV including a broadcast receiving apparatus according to Embodiment 1.

DESCRIPTION OF EMBODIMENTS (Knowledge on which the Present Invention is Based)

Each of the broadcast receiving apparatuses described in the Background Art will be specifically described hereinafter.

The broadcast receiving apparatus of PTL 1 plays back a broadcast content item and a communication content item in synchronization with each other. More specifically, the broadcast receiving apparatus starts receiving the communication content item before a broadcast start time of the broadcast content item, so that it plays back the broadcast content item and the communication content item in synchronization with each other. In other words, information on the communication content item is superimposed on a broadcast signal before the broadcast start time, and the signal is broadcast. Here, the broadcast receiving apparatus can start receiving the communication content item before the broadcast content item by obtaining the information beforehand.

Furthermore, the broadcast receiving apparatus of PTL 2 obtains such information from an electronic program guide (EPG). More specifically, the broadcast receiving apparatus obtains information on communication content items from the EPG even when information on the communication content items exists in the Web sites. Thus, the broadcast receiving apparatus obtains information on a communication content item before selecting a program to be broadcast, and plays back a broadcast content item and the communication content item in synchronization with each other, using the obtained information.

Furthermore, the broadcast receiving apparatus of PTL 3 applies a method ("Picture in Picture" abbreviated as "PiP") for playing back a main video and a sub-video in synchronization with each other. In this method, the sub-video to be displayed smaller can be superimposed on the main video to be displayed larger.

However, the Inventors have found that the broadcast receiving apparatuses of PTLs 1 to 3 have a problem of incapability of changing a layout of a video of a broadcast content item and a video of a communication content item. In other words, when the broadcast receiving apparatuses of PTLs 1 and 2 play back the video of the broadcast content item and the video of the communication content item in synchronization with each other, even using the PiP of PTL 3, the layout of the video of the broadcast content item and the video of the communication content item is fixed. Since a plane in which the main video is to be written and a plane in which the sub-video is to be written are fixed in the PiP of PTL 3, once the sub-video is displayed in full screen mode, the viewer cannot view the main video.

In order to solve such problems, the broadcast receiving apparatus according to an aspect of the present invention is a broadcast receiving apparatus that receives a broadcast content item to be broadcast, and includes: a communication content item receiving unit configured to receive a communication content item that is distributed through communication other than broadcasting and is related to the broadcast content item; a broadcast content item receiving unit configured to receive the broadcast content item; a plane for holding a picture of a broadcast video that is a video represented by the broadcast content item, and a picture of a communication video that is a video represented by the communication content item; a layout information obtaining unit configured to obtain layout information from outside of the broadcast receiving apparatus, the layout information indicating a layout of the broadcast video and the communication video; and a superimposing unit configured to superimpose the picture of the broadcast video and the picture of the communication video, according to the layout information for each set of the pictures, and output an image in which the picture of the broadcast video and the picture of the communication video are superimposed, the pictures being held in the plane.

Accordingly, with superimposition and output of the broadcast video and the communication video according to the layout indicated by the layout information, the broadcast receiving apparatus can change the layout of the video of the broadcast content item and the video of the communication content item according to the layout information. In other words, when a broadcast station broadcasts the layout information, the broadcast station can change the layout.

Furthermore, the layout information may indicate a display size and a display position of the broadcast video and a display size and a display position of the communication video to superimpose one of the broadcast video and the communication video at a position except for characterizing portions of the other of the broadcast video and the communication video, when the one is superimposed on the other and smaller than the other, and the superimposing unit may be configured to place the broadcast video and the communication video at the respective display positions with the respective display sizes, the display positions and the display sizes being indicated by the layout information.

As such, the broadcast receiving apparatus can appropriately change the layout of the broadcast video and the communication video according to the display sizes and the display positions.

Furthermore, the layout information may indicate a first layout and a second layout, the broadcast receiving apparatus may further include an instruction receiving unit configured to receive an instruction of a layout, the superimposing unit may be configured to: superimpose the communication video on the broadcast video according to the first layout and output an image of the broadcast video on which the communication video is superimposed, when the instruction receiving unit receives an instruction of the first layout; and superimpose the broadcast video on the communication video according to the second layout and output an image of the communication video on which the broadcast video is superimposed, when the instruction receiving unit receives an instruction of the second layout.

Accordingly, for example, when the broadcast receiving apparatus receives an instruction of the layout from the user, the user can change the layout in a range indicated by the layout information.

Furthermore, the plane may include a first plane for holding one of the picture of the broadcast video and the picture of the communication video, and a second plane for holding the other of the picture of the broadcast video and the picture of the communication video, and the superimposing unit may be configured to switch a plane for holding each of the picture of the broadcast video and the picture of the communication video between the first plane and the second plane to place the communication video in front of or behind the broadcast video.

Accordingly, for example, even when the order in which the pictures for the respective planes are superimposed is fixed so that the picture held in the first plane is placed behind and the picture held in the second plane is placed in front, since the type of a picture to be stored in each of the planes is switched, the order in which a picture of the broadcast video and a picture of the communication video are superimposed can be appropriately changed.

The broadcast receiving apparatus may further include a synchronization information obtaining unit configured to obtain synchronization information from outside of the broadcast receiving apparatus, wherein the superimposing unit may be configured to superimpose the communication video and the broadcast video according to the synchronization information and output an image in which the communication video and the broadcast video are superimposed to synchronize the communication video with the broadcast video.

Accordingly, the broadcast receiving apparatus can synchronize a communication video and a broadcast video in a state where the videos are appropriately superimposed, and display the videos to be easily viewed by the user.

Furthermore, the synchronization information may indicate, in association with each other, a playback position in the communication content item and a playback time at which data at the playback position is to be played back, and the superimposing unit may be configured to superimpose, at the playback time indicated by the synchronization information, (i) the picture of the communication video at the playback position indicated in association with the playback time and (U) the picture of the broadcast video, and output the image in which the picture of the broadcast video and the picture of the communication video are superimposed.

Accordingly, the broadcast receiving apparatus can superimpose (i) appropriate one of pictures included in the communication video for a picture in a broadcast video and (ii) the picture in the broadcast video.

Furthermore, the synchronization information may further indicate a type of the broadcast content item as a broadcast type, and the superimposing unit may be configured to determine whether or not the broadcast content item is to be broadcast live, according to the broadcast type, and prohibit superimposition of the broadcast video and the communication video when determining that the broadcast content item is to be broadcast live.

When a state of communication other than broadcasting (for example, communication via the Internet) becomes worse, reception of a communication content item is delayed. As a result, a broadcast content item and a communication content item sometimes cannot be synchronized. Thus, in order to appropriately synchronize these content items even under the influence of a communication state, it is necessary to start receiving a communication content item earlier than reception of a broadcast content item. However, when the broadcast content item is broadcast live, reception of the communication content item cannot start earlier than reception of the broadcast content item. Thus, when a broadcast content item is to be broadcast live, the broadcast receiving apparatus according to the aspect of the present invention can display only the broadcast video on a display and prevent the user from having the burden of viewing an asynchronous video to be displayed, by prohibiting the superimposition of the broadcast video and the communication video.

Furthermore, the synchronization information may further include still image identification information for identifying a still image, and the superimposing unit may be configured to superimpose the still image identified by the still image identification information, the broadcast video, and the communication video, and output an image in which the still image, the broadcast video, and the communication video are superimposed.

Accordingly, the still image appropriate for the broadcast video and the communication video can be superimposed on these videos, and displayed.

Furthermore, the superimposing unit may be configured to output the broadcast video without superimposing the communication video, when the communication content item receiving unit does not receive the communication content item.

Accordingly, it is possible to reduce the burden for the viewer to view a video without any undue superimposition on the video.

Furthermore, the superimposing unit may be configured to: enlarge a display size of the broadcast video to a display size of a display panel, when the communication content item receiving unit is not in a state of receiving the communication content item, in the case where the communication video is displayed on the entirety of the display panel, while the broadcast video is superimposed on the communication video with a size smaller than the display size of the display panel; and reduce the display size of the broadcast video to be smaller than the display size of the display panel, when the communication content item receiving unit is in the state of receiving the communication content item.

Accordingly, even when the communication state of communication other than broadcasting such as communication via the Internet varies, the video can be displayed to be easily viewed by the user.

Furthermore, the broadcast receiving apparatus may further include a communication state obtaining unit configured to obtain communication state information indicating a communication state other than the broadcasting, wherein the communication content item receiving unit may be configured to receive the communication content having quality that matches the communication state indicated by the communication state information, from among a plurality of communication content items related to the broadcast content item.

Thus, the broadcast receiving apparatus can receive an appropriate communication content item according to a communication state, and then display the communication video to be easily viewed by the user.

Furthermore, the broadcast receiving apparatus may further include a communication state obtaining unit configured to obtain communication state information indicating a communication state other than the broadcasting, wherein the superimposing unit may be configured to output the broadcast video without superimposing the communication video, when an index value indicating the communication state indicated by communication state information is higher or lower than a predetermined value.

For example, the index value indicating a communication state is an available bit rate or a frequency of a packet loss. When such an index value is higher or lower than a predetermined value, there is a high possibility that the communication content item receiving unit does not receive a communication content item. Thus, since the broadcast receiving apparatus according to the aspect of the present invention does not superimpose a communication video in such a case, it is possible to prevent an undue superimposition on a video and reduce the burden for the viewer to view the video.

Furthermore, the superimposing unit may be configured to: consecutively output, within a unit of time, (i) a broadcast picture that is the picture included in the broadcast video and (ii) a communication picture that is the picture included in the communication video and is stereoscopically viewed in pair with the broadcast picture, without superimposing the broadcast picture and the communication picture, when the broadcast video and the communication video are videos which are stereoscopically viewed by being visually recognized by respective eyes and each of which includes pictures; and output the broadcast picture within the unit of time twice consecutively, when the communication content item receiving unit does not receive the communication picture.

Accordingly, a video can be displayed in 3D with the broadcast video and the communication video. When the communication content item is not received, the superimposing unit outputs the broadcast picture twice consecutively. Thus, it is possible to switch display of a video from 3D to 2D, and to prevent an inappropriate video from being displayed.

Furthermore, the communication content item receiving unit may be configured to receive an other communication content item related to a part of the broadcast content item, the part being received by the broadcast content item receiving unit after a communication state other than the broadcasting is switched from a reception capable state in which the communication content item can be received to a state in which the communication content item cannot be received, and is back to the reception capable state, while the broadcast content item receiving unit receives the broadcast content item, and the superimposing unit may be configured to superimpose the broadcast video and the other communication video according to the layout information, and output an image in which the broadcast video and the other communication video are superimposed.

Accordingly, when the communication state other than the broadcasting is restored to the normal state, it is possible to appropriately resume superimposition of the videos according to the layout information.

The broadcast receiving apparatus may further include a location information obtaining unit configured to obtain location information indicating a location of an other communication content item representing a video of a continuation of the broadcast content item, wherein the communication content item receiving unit may be configured to receive the other communication content item from the location indicated by the location information, when the broadcast content item receiving unit finishes receiving the broadcast content item, and the superimposing unit may be configured to output the other communication content item after the broadcast content item receiving unit finishes receiving the broadcast content item.

Accordingly, the user can view a communication content item as the continuation of the broadcast content item, and the convenience of the user can be improved.

The broadcast receiving apparatus may further include a location information obtaining unit configured to obtain location information indicating a location of the communication content item representing the communication video identical to the broadcast video, wherein the communication content item receiving unit may be configured to receive the communication content item from the location indicated by the location information, upon receipt of an operation from a user after the broadcast content item receiving unit starts receiving the broadcast content item, and the superimposing unit may be configured to start outputting the broadcast video when the broadcast content item receiving unit starts receiving the broadcast content item, and superimpose, according to the layout information, the broadcast video and the communication video indicated from the beginning of the communication content item and output an image in which the broadcast video and the communication video are superimposed when the communication content item receiving unit starts receiving the communication content item.

Accordingly, even when the user misses the first portion of a broadcast content item, the user can view the corresponding communication content item from the beginning as the missed first portion, and the convenience of the user can be improved.

Furthermore, the superimposing unit may be configured to enlarge the communication video to be displayed on the entirety of a display panel and output the enlarged communication video, instead of superimposition of the broadcast video and the communication video.

Accordingly, it is possible to display the missed portion to be easily viewed by the user.

Furthermore, the superimposing unit may be configured to: output the communication video of the communication content item to be played back at a fast speed until an image currently displayed in the broadcast video becomes identical to an image currently displayed in the communication video; and output the communication video of the communication content item to be played back at a normal speed when the image currently displayed in the broadcast video is identical to the image currently displayed in the communication video.

Accordingly, the missed portion is played back at a fast speed and displayed. When the playback position in the communication content item reaches a playback position in the broadcast content item, the communication content item is played back at a normal speed and the communication video and the broadcast video are superimposed and displayed. Thus, even when the first portion of a broadcast content item is missed, the missed portion can be displayed to the user and the communication video and the broadcast video that are synchronized can be also displayed to the user.

The present invention can be implemented not only as such a broadcast receiving apparatus but also as an integrated circuit, as a method for receiving a broadcast content item by the broadcast receiving apparatus, as a program causing a computer to receive the broadcast content item, and as a recording medium for storing the program.

Hereinafter, Embodiments of the present invention will be described with reference to the drawings.

Embodiments to be described below are all general or specific examples. The values, shapes, materials, constituent elements, positions and connections of the constituent elements, steps, and orders of the steps indicated in Embodiments are examples, and do not limit the present invention. Furthermore, the constituent elements in Embodiments that are not described in independent Claims that describe the most generic concept of the present invention are described as arbitrary constituent elements.

(Embodiment 1)

FIG. 1 illustrates a system including a TV including a broadcast receiving apparatus according to Embodiment 1.

The system is a broadcast/communication integrating system in which broadcasting and communication have been integrated, and includes a broadcast station 101 that broadcasts a broadcast content item, a TV 104, a server 102 that distributes a communication content item, and an Internet connection 103. The broadcast station 101 superimposes a broadcast content item on broadcast waves or a broadcast signal, and broadcasts the broadcast content item. The server 102 transmits the communication content item to the TV 104 via the Internet connection 103.

The TV 104 includes a broadcast receiving apparatus according to Embodiment 1 and a display. The broadcast receiving apparatus receives the broadcast content item and the communication content item. Then, the broadcast receiving apparatus superimposes a broadcast video that is a video represented by the broadcast content item and a communication video that is a video represented by the communication content item, and outputs an image in which the broadcast video and the communication video are superimposed, to the display. Accordingly, the display displays the image in which the broadcast video and the communication video are superimposed. Although the TV 104 includes the broadcast receiving apparatus according to Embodiment 1, the broadcast receiving apparatus may be included in other apparatuses or devices. Furthermore, the image in which the broadcast video and the communication video are superimposed will be hereinafter referred to as a PiP image.

Figure 2:
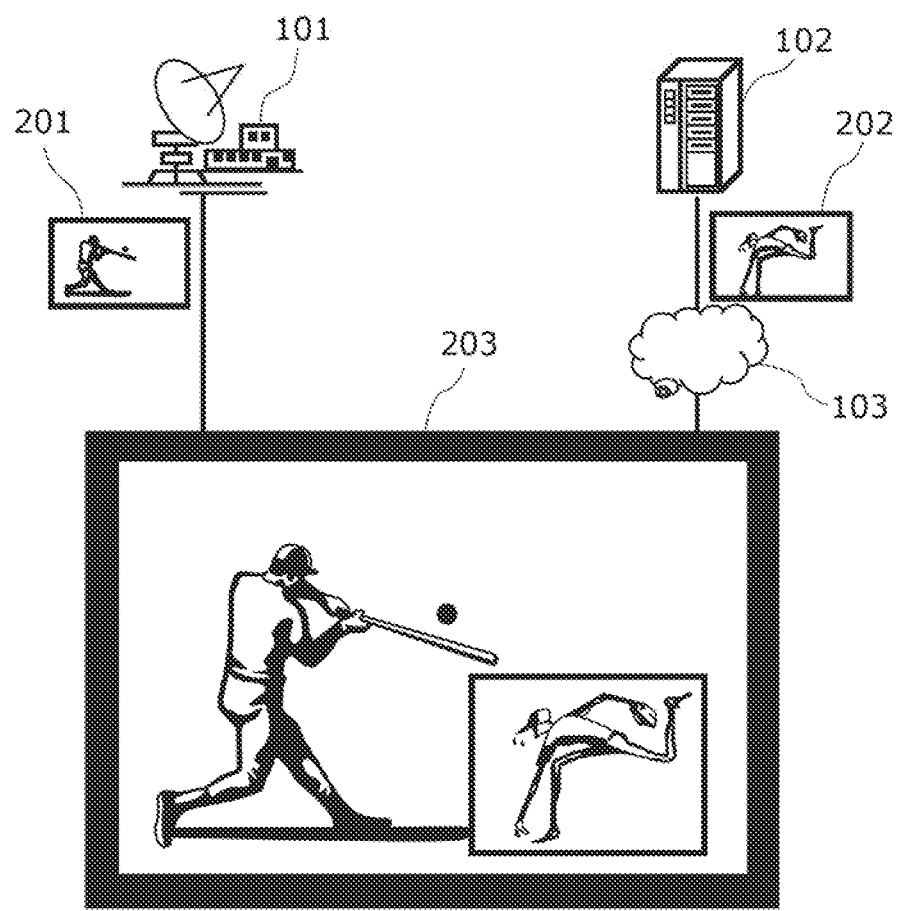
FIG. 2 illustrates an example of a PiP image according to Embodiment 1.

FIG. 2 illustrates an example of the PIP image.

For example, synchronized playback of the broadcast content item and the communication content item enables multi-angle viewing of a baseball game live. The broadcast receiving apparatus receives (i) a broadcast content item 201 to be broadcast from the broadcast station 101, and (ii) a communication content item 202 to be distributed from the server 102 via the Internet connection 103. Then, the broadcast receiving apparatus superimposes a broadcast video of the broadcast content item 201 and a communication video of the communication content item 202, and outputs an image in which the broadcast video and the communication video are superimposed, to the display 203. The broadcast content item 201 indicates the broadcast video that is a video captured from an angle of a batter, and the communication content item 202 indicates the broadcast video that is a video captured from an angle of a pitcher. As such, the communication content item complements elements that cannot be expressed solely by the broadcast content item, thus conveying to the viewer a greater sense of realism. The broadcast receiving apparatus may obtain and output, as a communication content item, voice or subtitles in a language that is/are not included in the broadcast content item 201, special video, and others when the broadcast content item 201 and the communication content item 202 are played back in synchronization with each other.

Figure 3:
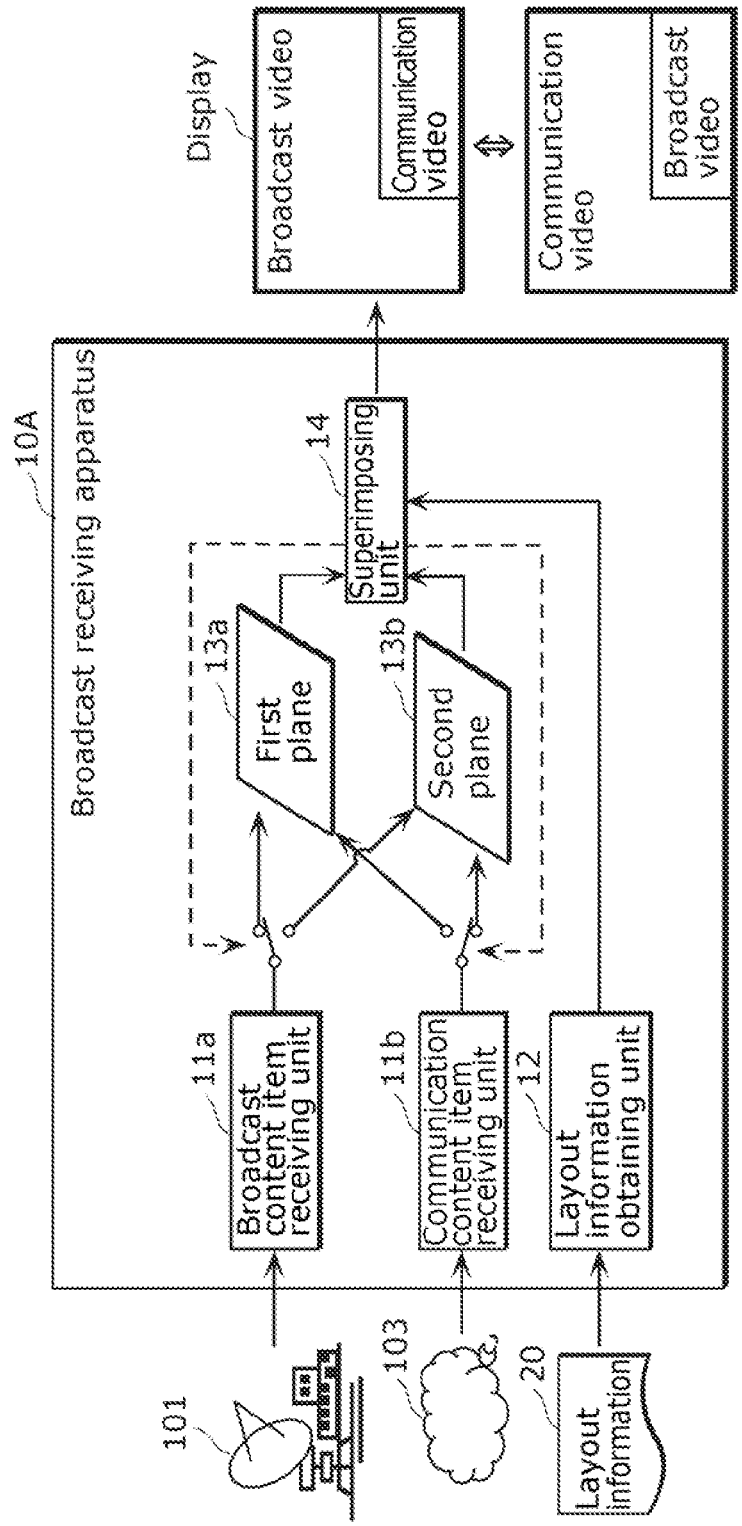
FIG. 3 illustrates a configuration of the broadcast receiving apparatus according to Embodiment 1.

FIG. 3 illustrates a configuration of the broadcast receiving apparatus according to Embodiment 1.

A broadcast receiving apparatus 10A according to Embodiment 1 is a broadcast receiving apparatus that receives a broadcast content item to be broadcast, and includes a broadcast content item receiving unit 11a, a communication content item receiving unit 11b, first and second planes 13a and 13b, a layout information obtaining unit 12, and a superimposing unit 14.

The broadcast content item receiving unit 11a receives a broadcast content item. The communication content item receiving unit 11b receives a communication content item that is distributed through communication other than broadcasting and is related to the broadcast content item. The communication other than the broadcasting is communication via, for example, the Internet connection 103, and will also be simply referred to as communication.

The first plane 13a and the second plane 13b are planes for holding a picture of a broadcast video that is a video represented by the broadcast content item, and a picture of a communication video that is a video represented by the communication content item. For example, the first plane 13a holds the picture of one of the broadcast video and the communication video, and the second plane 13b holds the picture of the other of the broadcast video and the communication video. The broadcast receiving apparatus 10A may include one plane including the first and second planes 13a and 13b.

The layout information obtaining unit 12 obtains layout information 20 indicating a layout of the broadcast video and the communication video from outside of the broadcast receiving apparatus 10A. For example, the layout information 20 is distributed through broadcasting or communication.

The superimposing unit 14 superimposes the picture of the broadcast video and the picture of the communication video held in the first plane 13a and the second plane 13b for each set of the pictures, according to the layout information 20, and outputs an image in which the picture of the broadcast video and the picture of the communication video are superimposed. For example, the superimposing unit 14 switches a plane for holding each of the picture of the broadcast video and the picture of the communication video between the first and second planes 13a and 13b to place the communication video in front of or behind the broadcast video. Accordingly, for example, even when the order in which the pictures held in the planes are superimposed is fixed so that the picture held in the first plane 13a is placed behind and the picture held in the second plane 13b is placed in front, since the type of pictures to be stored in each of the planes is switched, the order in which the pictures of the broadcast video and the communication video are superimposed can be appropriately changed.

The plane for holding the picture of the broadcast video may be fixed to the first plane 13a, and the plane for holding the picture of the communication video may be fixed to the second plane 13b. In such a case, the superimposing unit 14 superimposes two pictures held in the first and second planes 13a and 13b, in the order according to the layout information 20.

Accordingly, since the broadcast receiving apparatus 10A according to Embodiment 1 superimposes the broadcast video and the communication video according to the layout indicated by the layout information 20 and outputs an image in which the broadcast video and the communication video are superimposed, it can change the layout of the video of the broadcast content item and the video of the communication content item according to the layout information 20. In other words, when the broadcast station 101 broadcasts the layout information 20, the broadcast station 101 can change the layout.

Figure 4:
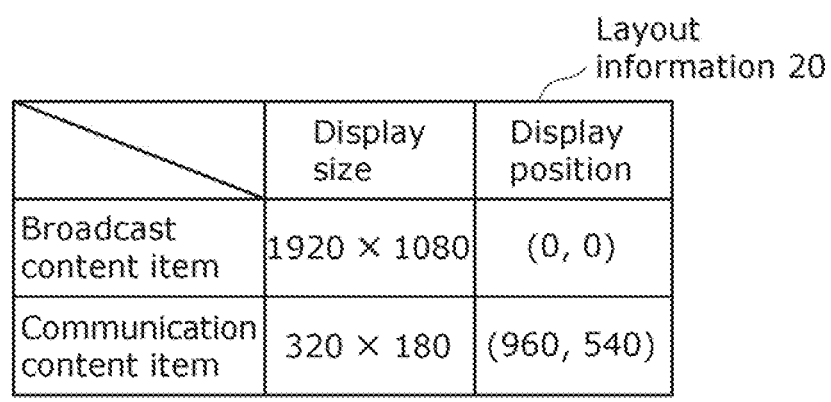
FIG. 4 shows an example of layout information according to Embodiment 1.

FIG. 4 shows an example of the layout information 20.

As shown in FIG. 4, the layout information 20 indicates a display size and a display position of a broadcast video of a broadcast content item, and a display size and a display position of a communication video of a communication content item. Here, when one of the broadcast video and the communication video is superimposed on the other of the broadcast video and the communication video and smaller than the other, the layout information 20 indicates the display size and the display position of the broadcast video and the display size and the display position of the communication video to superimpose the one at a position except for characterizing portions of the other.

Here, the superimposing unit 14 places the broadcast video and the communication video at the respective display positions thereof with the respective sizes that are indicated in the layout information 20.

As such, the broadcast receiving apparatus 10A according to Embodiment 1 can appropriately change the layout of the broadcast video and the communication video according to the display sizes and the display positions.

Figure 5:
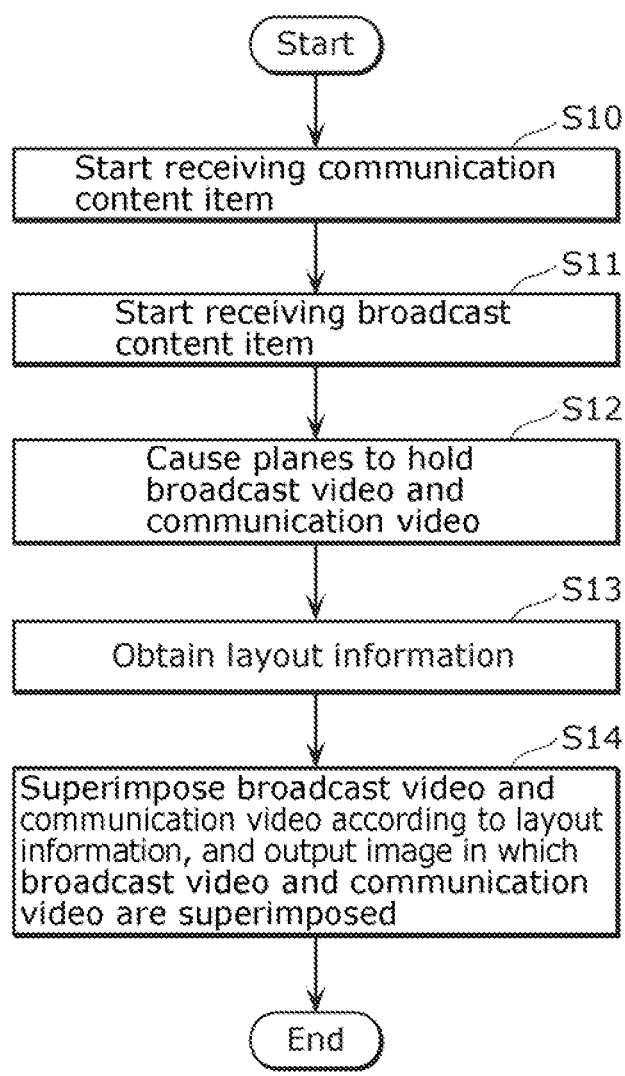
FIG. 5 is a flowchart indicating operations of the broadcast receiving apparatus according to Embodiment 1.

FIG. 5 is a flowchart indicating operations of the broadcast receiving apparatus 10A according to Embodiment 1.

First, the broadcast receiving apparatus 10A starts receiving a communication content item that is distributed through communication other than broadcasting and is related to the broadcast content item (Step S10). Next, the broadcast receiving apparatus 10A receives a broadcast content item (Step S11). Then, the broadcast receiving apparatus 10A causes the first plane 13a and the second plane 13b to hold the picture of the broadcast video that is a video represented by the broadcast content item and the picture of the communication video that is a video represented by the communication content item (Step S12).

Next, the broadcast receiving apparatus 10A obtains the layout information 20 indicating a layout of the broadcast video and the communication video from outside of the broadcast receiving apparatus 10A (Step S13). The broadcast receiving apparatus 10A superimposes the picture of the broadcast video and the picture of the communication video held in the first plane 13a and the second plane 13b for each set of the pictures, according to the layout information 20, and outputs an image in which the picture of the broadcast video and the picture of the communication video are superimposed (Step S14).

Here, when the communication content item receiving unit 11b does not receive the communication content item, the superimposing unit 14 may output the broadcast video without superimposing the communication video. Accordingly, it is possible to reduce the burden for the viewer to view the video without any undue superimposition of a video.

Furthermore, there are cases where the communication video is displayed on the entirety of the display 203, and the broadcast video is superimposed on the communication video with a size smaller than the display size of the display 203. Here, when the communication content item receiving unit 11b is not in a state of receiving the communication content item, the superimposing unit 14 may enlarge the display size of the broadcast video to the display size of the display 203. When the communication content item receiving unit 11b is in a state of receiving the communication content item, the superimposing unit 14 may reduce the display size of the broadcast video to the size smaller than the display size of the display 203. Accordingly, even when the communication state of communication other than broadcasting, such as communication via the Internet connection 103 varies, the video can be displayed to be easily viewed by the user.

Furthermore, when the broadcast content item receiving unit 11a receives a broadcast content item, there are cases where the communication state other than the broadcasting is switched from a reception capable state in which a communication content item can be received to a state in which the communication content item cannot be received, and is back to the reception capable state. Here, the communication content item receiving unit 11b may receive another communication content item related to a part of the broadcast content item received by the broadcast content item receiving unit 11a after the reception capable state. Here, the superimposing unit 14 superimposes the broadcast video and the other communication video according to the layout information 20, and outputs an image in which the broadcast video and the other communication video are superimposed. Accordingly, when the communication state other than the broadcasting is restored to the normal state, it is possible to appropriately resume superimposition of videos according to the layout information 20.

(Variation 1)

Here, Variation 1 of Embodiment 1 will be hereinafter described. A broadcast receiving apparatus according to Variation 1 features changing a layout according to an instruction of the user.

FIG. 6 shows layout information according to Variation 1.

Layout information 20a indicates first and second layouts. For example, the first layout is a layout for using a broadcast video of a broadcast content item as a main video and using a communication video of a communication content item as a sub-video. Conversely, the second layout is a layout for using a broadcast video of a broadcast content item as a sub-video and using a communication video of a communication content item as a main video.

Figure 7:
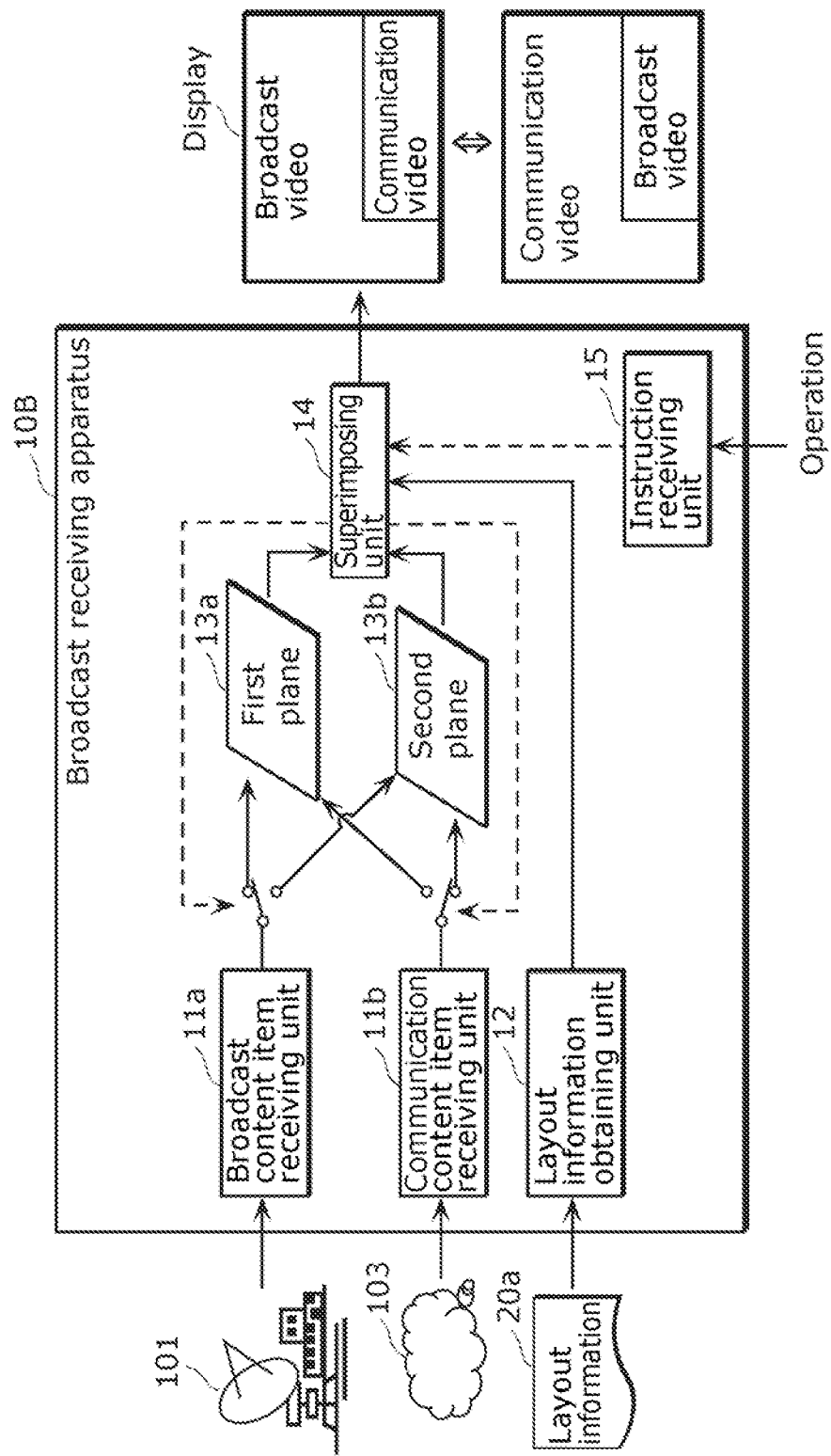
FIG. 7 illustrates a configuration of a broadcast receiving apparatus according to Variation 1 of Embodiment 1.

FIG. 7 illustrates a configuration of a broadcast receiving apparatus according to Variation 1.

A broadcast receiving apparatus 10B according to Variation 1 includes the constituent elements included in the broadcast receiving apparatus 10A, and additionally includes an instruction receiving unit 15 that receives an instruction of a layout. When the instruction receiving unit 15 receives an instruction of the first layout, the superimposing unit 14 superimposes a communication video on a broadcast video according to the first layout, and outputs an image of the broadcast video on which the communication video is superimposed. When the instruction receiving unit 15 receives an instruction of the second layout, the superimposing unit 14 superimposes a broadcast video on a communication video according to the second layout, and outputs an image of the communication video on which the broadcast video is superimposed.

As such, upon receipt of an instruction of a layout from the user, the broadcast receiving apparatus 1013 according to Variation 1 allows the user to change the layout in a range indicated by the layout information 20a.

(Variation 2)

Variation 2 of Embodiment 1 will be hereinafter described. The broadcast receiving apparatus according to Variation 2 features synchronizing a broadcast content item and a communication content item.

Figure 8:
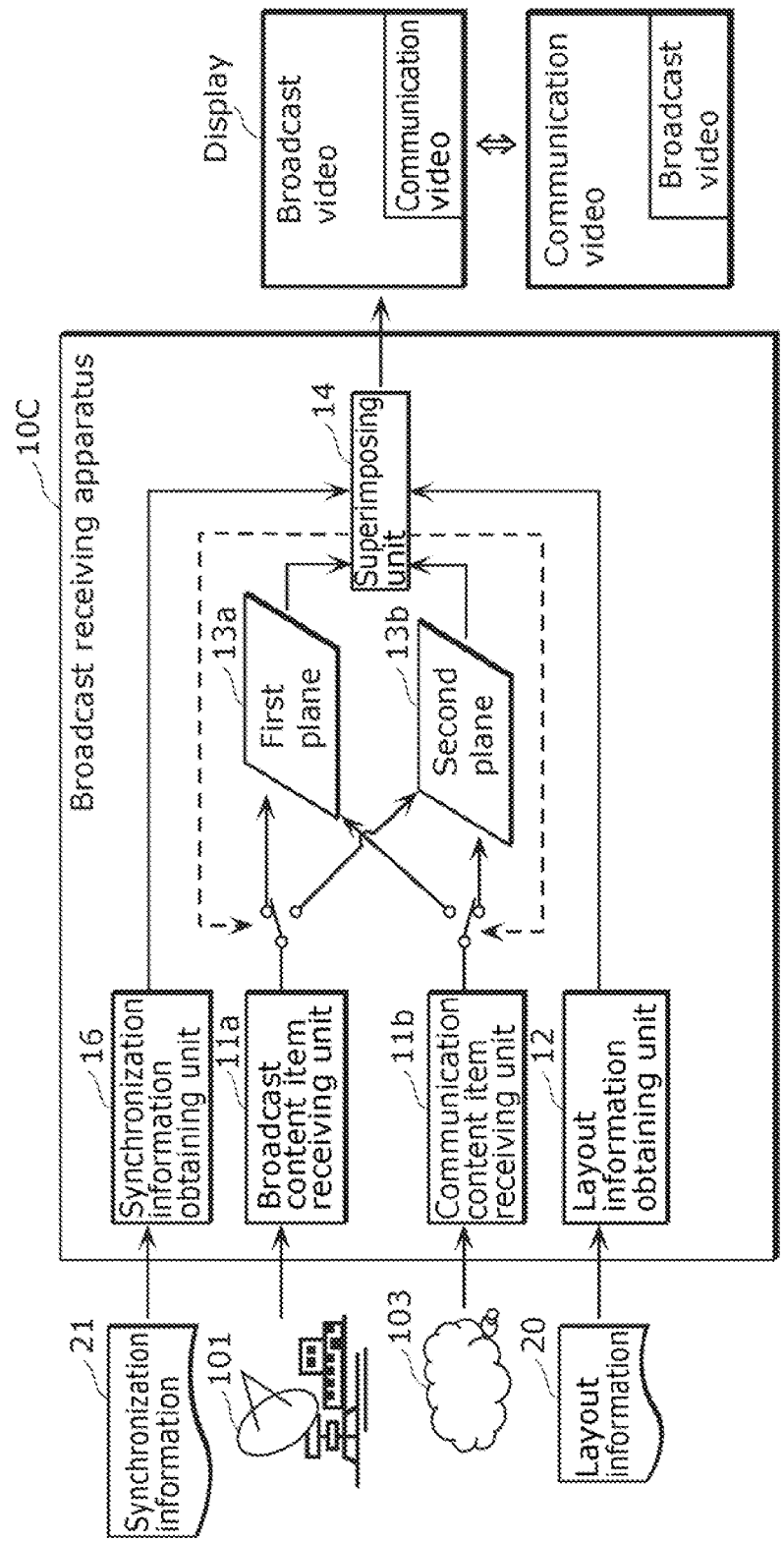
FIG. 8 illustrates a configuration of a broadcast receiving apparatus according to Variation 2 of Embodiment 1.

FIG. 8 illustrates a configuration of a broadcast receiving apparatus according to Variation 2.

A broadcast receiving apparatus 10C according to Variation 2 includes the constituent elements included in the broadcast receiving apparatus 10A, and additionally includes a synchronization information obtaining unit 16 that receives synchronization information 21 from outside of the broadcast receiving apparatus 10C. Then, the superimposing unit 14 synchronizes a communication video with a broadcast video, by superimposing the two videos according to the synchronization information 21 and outputting the superimposed videos.

Accordingly, the broadcast receiving apparatus 10C according to Variation 2 can synchronize a communication video and a broadcast video in a state where the videos are appropriately superimposed, and display the videos to be easily viewed by the user.

FIG. 9 shows an example of the synchronization information 21 according to Variation 2.

The synchronization information 21 indicates a playback position in a communication content item and a playback time at which data at the playback position is to be played back, in association with each other, and also indicates a type of a broadcast content item as a broadcast type. Furthermore, the synchronization information 21 includes still image identification information for identifying a still image.

The superimposing unit 14 superimposes, at the playback time indicated by the synchronization information 21, (i) a picture that is at the playback position indicated in association with the playback time and is included in the communication video and (ii) a picture of a broadcast video, and outputs the image in which the picture of the broadcast video and the picture of the communication video are superimposed. Accordingly, it is possible to superimpose (i) appropriate one of pictures included in the communication video for a picture in a broadcast video and (ii) the picture in the broadcast video.

Furthermore, the superimposing unit 14 determines whether or not the broadcast content item is to be broadcast live, according to a broadcast type, and when determining that the content is to be broadcast live, it prohibits superimposition of a broadcast video and a communication video.

Here, when a state of communication (for example, communication via the Internet connection 103) becomes worse, reception of a communication content item is delayed. As a result, a broadcast content item and a communication content item sometimes cannot be synchronized. Thus, in order to appropriately synchronize these content items even under the influence of a communication state, it is necessary to start receiving a communication content item earlier than reception of a broadcast content item. However, when the broadcast content item is broadcast live, reception of the communication content item cannot start earlier than reception of the broadcast content item. Thus, when a broadcast content item is to be broadcast live, the broadcast receiving apparatus 10C according to Variation 2 can display only the broadcast video on a display and prevent the user from having a burden of viewing an asynchronous video to be displayed, by prohibiting the superimposition of the broadcast video and the communication video.

Furthermore, the superimposing unit 14 superimposes the still image identified by the still image identification information, on the broadcast video and the communication video, and outputs an image in which the still image is superimposed on the broadcast video and the communication video. Accordingly, the still image appropriate for the broadcast video and the communication video can be superimposed on these videos, and displayed.

(Variation 3)

Variation 3 of Embodiment 1 will be hereinafter described. A broadcast receiving apparatus according to Variation 3 features processing according to a communication state.

Figure 10:
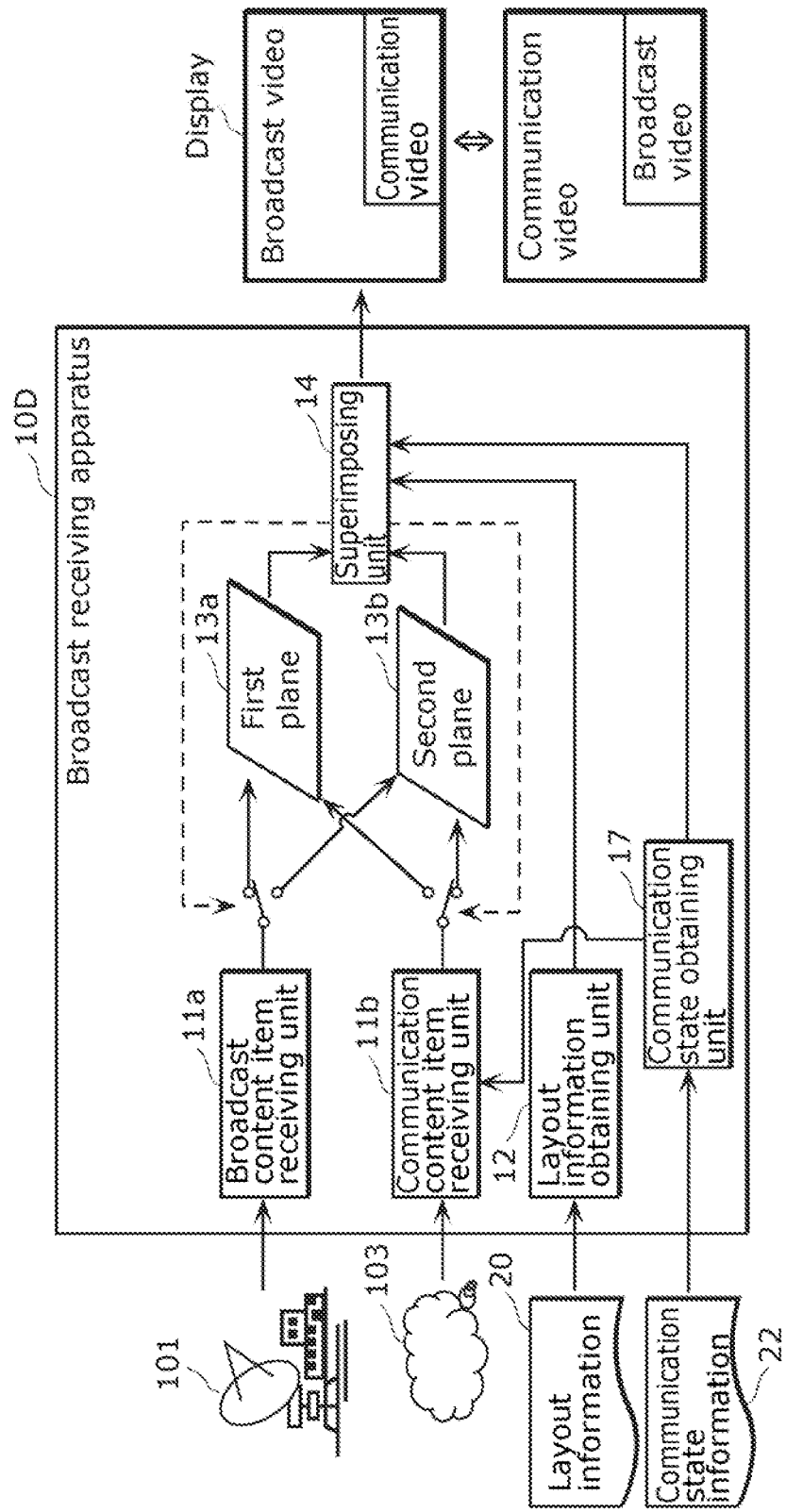
FIG. 10 illustrates a configuration of a broadcast receiving apparatus according to Variation 3 of Embodiment 1.

FIG. 10 illustrates a configuration of the broadcast receiving apparatus according to Variation 3.

A broadcast receiving apparatus 10D according to Variation 3 includes the constituent elements included in the broadcast receiving apparatus 10A, and additionally includes a communication state obtaining unit 17 that obtains communication state information 22 indicating a communication state other than broadcasting.

The communication content item receiving unit 11b according to Variation 3 receives a communication content item having quality that matches the communication state indicated by the communication state information 22, from among a plurality of communication content items related to a broadcast content item.

Here, bit rates or resolutions of the communication content items are different from each other. The communication content item receiving unit 11b receives one of the communication content items having a bit rate or a resolution that matches the communication state indicated by the communication state information 22.

Thus, it is possible to receive an appropriate communication content item according to the communication state, and display the communication video to be easily viewed by the user.

Furthermore, the superimposing unit 14 may output a broadcast video without superimposing any communication video, when an index value indicating the communication state indicated by the communication state information 22 is higher or lower than a predetermined value.

For example, the index value indicating a communication state is an available bit rate or frequency of a packet loss. When such an index value is higher or lower than a predetermined value, there is a high possibility that the communication content item receiving unit 11b does not receive a communication content item. Since the broadcast receiving apparatus 10D according to Variation 3 does not superimpose a communication video in such a case, it is possible to prevent undue superimposition of a video and reduce the burden for the viewer to view the video.

(Variation 4)

Variation 4 of Embodiment 1 will be hereinafter described. A broadcast receiving apparatus according to Variation 4 features complementing a continuation of a broadcast content item or a video of the broadcast content item missed by the user, with a communication content item.

Figure 11:
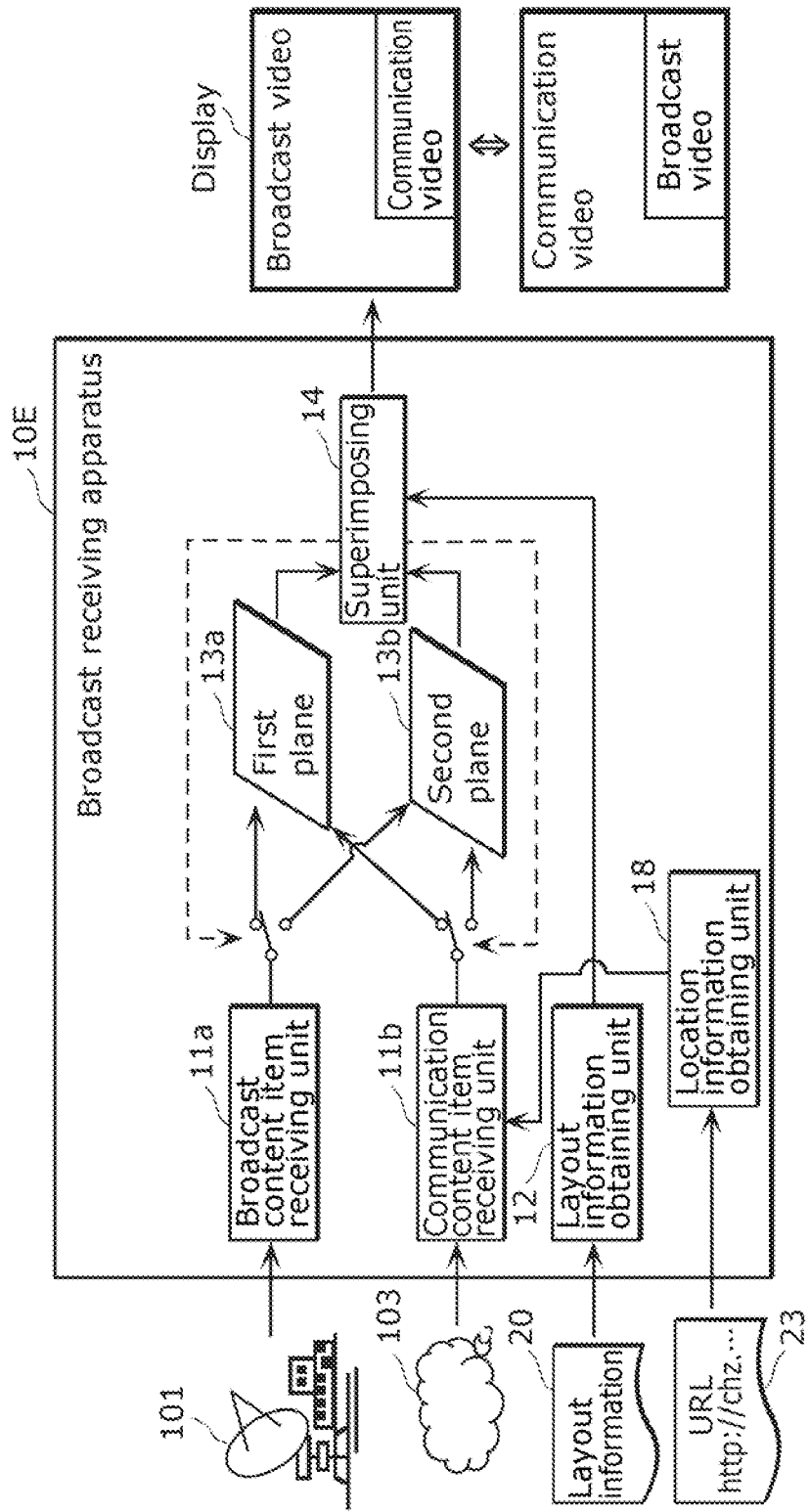
FIG. 11 illustrates a configuration of a broadcast receiving apparatus according to Variation 4 of Embodiment 1.

FIG. 11 illustrates a configuration of a broadcast receiving apparatus 10E according to Variation 4.

The broadcast receiving apparatus 10E includes the constituent elements included in the broadcast receiving apparatus 10A, and additionally includes a location information obtaining unit 18 that obtains location information 23 indicating a location of another communication content item representing a video of a continuation of a broadcast content item.

Once the broadcast content item receiving unit 11a finishes receiving a broadcast content item, the communication content item receiving unit 11b according to Variation 4 receives another communication content item from the location indicated by the location information 23. Furthermore, once the broadcast content item receiving unit 11a finishes receiving a broadcast content item, the superimposing unit 14 according to Variation 4 outputs another communication content item.

Accordingly, the user can view a communication content item as the continuation of the broadcast content item, and the convenience of the user can be improved.

Here, the location information obtaining unit 18 may obtain the location information 23 indicating a location of a communication content item representing the communication video identical to the broadcast video.

After the broadcast content item receiving unit 11a starts receiving a broadcast content item, upon receipt of an operation from the user, the communication content item receiving unit 11b receives a communication content item from the location indicated by the location information 23. When the broadcast content item receiving unit 11a starts receiving a broadcast content item, the superimposing unit 14 starts outputting a broadcast video. When the communication content item receiving unit 11b starts receiving a communication content item, the superimposing unit 14 superimposes a broadcast video and the communication video indicated from the beginning of the communication content item, according to the layout information 20, and outputs an image in which the broadcast video and the communication video are superimposed.

Accordingly, even when the user misses the first portion of a broadcast content item, the user can view the corresponding communication content from the beginning as the missed first portion, and the convenience of the user can be improved.

Furthermore, the superimposing unit 14 may enlarge the communication video to be displayed on the entirety of the display 203 and output the enlarged communication video instead of superimposition of the broadcast video and the communication video. Accordingly, it is possible to display the missed portion to be easily viewed by the user.

Furthermore, the superimposing unit 14 may output a communication video of a communication content item to be played back at a fast speed until the image currently displayed in the broadcast video becomes identical to the image currently displayed in the communication video. Furthermore, the superimposing unit 14 may output a communication video of a communication content item to be played back at a normal speed when the image currently displayed in the broadcast video is identical to the image currently displayed in the communication video.

Accordingly, the missed portion is played back at a fast speed and displayed. When the playback position in the communication content item reaches a playback position in the broadcast content item, the communication content item is played back at a normal speed and the communication video and the broadcast video are superimposed and displayed. Thus, even when the user misses the first portion of a broadcast content item, the missed portion can be displayed to the user and the communication video and the broadcast video that are synchronized can be also displayed to the user.

Here, the location information 23 may be included in the synchronization information 21.

(Variation 5)

Variation 5 of Embodiment 1 will be hereinafter described. A broadcast receiving apparatus according to Variation 5 features 3D display of a video.

In Variation 5, a broadcast video and a communication video are videos stereoscopically viewed by being visually recognized by respective eyes, and each of the video includes pictures.

Here, the superimposing unit 14 according to Variation 5 consecutively outputs, within a unit of time, a broadcast picture that is a picture included in the broadcast video, and a communication picture that is a picture included in the communication video and is stereoscopically viewed in pair with the broadcast picture, without superimposing the broadcast picture and the communication picture. Furthermore, when the communication content item receiving unit 11b does not receive the communication picture, the superimposing unit 14 outputs the broadcast picture within a unit of time twice consecutively.

Figure 12A:
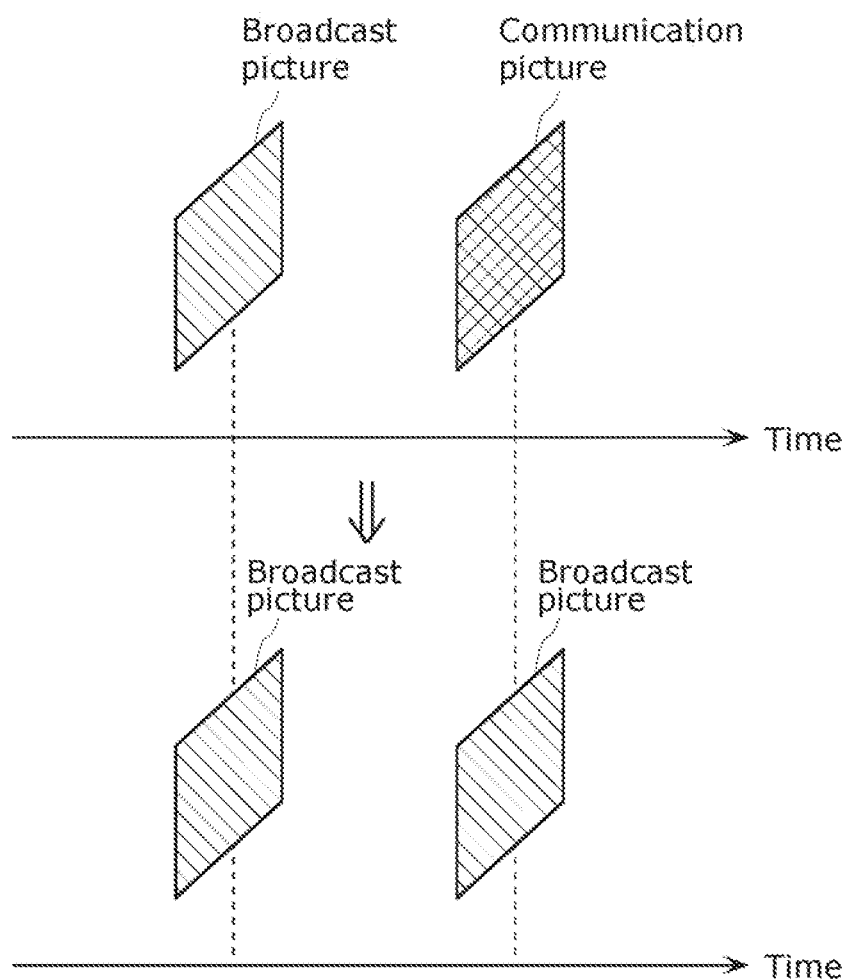
FIG. 12A illustrates pictures to be output from a superimposing unit according to Variation 5 of Embodiment 1.

FIG. 12A illustrates pictures to be output from the superimposing unit 14.

As illustrated in FIG. 12A, the superimposing unit 14 consecutively outputs, within a unit of time, the broadcast picture and the communication picture that is stereoscopically viewed in pair with the broadcast picture. Furthermore, when the communication content item receiving unit 11b does not receive a communication picture, the superimposing unit 14 outputs the broadcast picture within a unit of time twice consecutively.

With the broadcast video and the communication video, the videos can be displayed in 3D. Furthermore, when the communication content item receiving unit 11b does not receive a communication content item, the superimposing unit 14 outputs the broadcast picture twice consecutively.

Thus, display of a video can be appropriately switched from 3D to 2D. As a result, it is possible to prevent an inappropriate video from being displayed.

The broadcast receiving apparatus according to Variation 5 does not have to include the layout information obtaining unit 12 and the superimposing unit 14. In other words, the broadcast receiving apparatus has only to include at least a 3D display function for videos using the broadcast picture and the communication picture held in the first and second planes 13a and 13b, without having a function of superimposing and outputting these pictures according to the layout information 20.

FIG. 12B illustrates another configuration of the broadcast receiving apparatus according to Variation 5.

A broadcast receiving apparatus 10F is an apparatus that does not have a function of superimposing and outputting a broadcast picture and a communication picture, and includes the broadcast content item receiving unit 11a, the communication content item receiving unit 11b, the first and second planes 13a and 13b, and an output unit 14F.

Specifically, the broadcast receiving apparatus 10F is a broadcast receiving apparatus that receives a broadcast content item to be broadcast, and includes: the communication content item receiving unit 11b that receives a communication content item that is to be distributed through communication other than broadcasting and is related to the broadcast content item; the broadcast content item receiving unit 11a that receives the broadcast content item; the first plane 13a and the second plane 13b for holding a picture (broadcast picture) of a broadcast video that is a video represented by the broadcast content item and a picture (communication picture) of a communication video that is a video represented by the communication content item; and an output unit 14F that outputs the broadcast picture and the communication picture held in the first and second planes 13a and 13b.

When the broadcast video and the communication video are videos which are stereoscopically viewed by being visually recognized by respective eyes and each of which includes pictures, the output unit 14F alternately and consecutively outputs (i) the broadcast picture that is a picture included in the broadcast video and the communication picture that is a picture included in the communication video and is stereoscopically viewed in pair with the broadcast picture. When the communication content item receiving unit 11b does not receive the communication picture, the output unit 14F outputs the broadcast picture twice consecutively.

When the broadcast receiving apparatus 10F does not receive the communication content item, the output unit 10F outputs the broadcast picture twice consecutively. Thus, display of a video can be appropriately switched from 3D to 2D. As a result, it is possible to prevent an inappropriate video from being displayed.

(Embodiment 2)

Embodiment 2 will describe details of a broadcast receiving apparatus.

Figure 13:
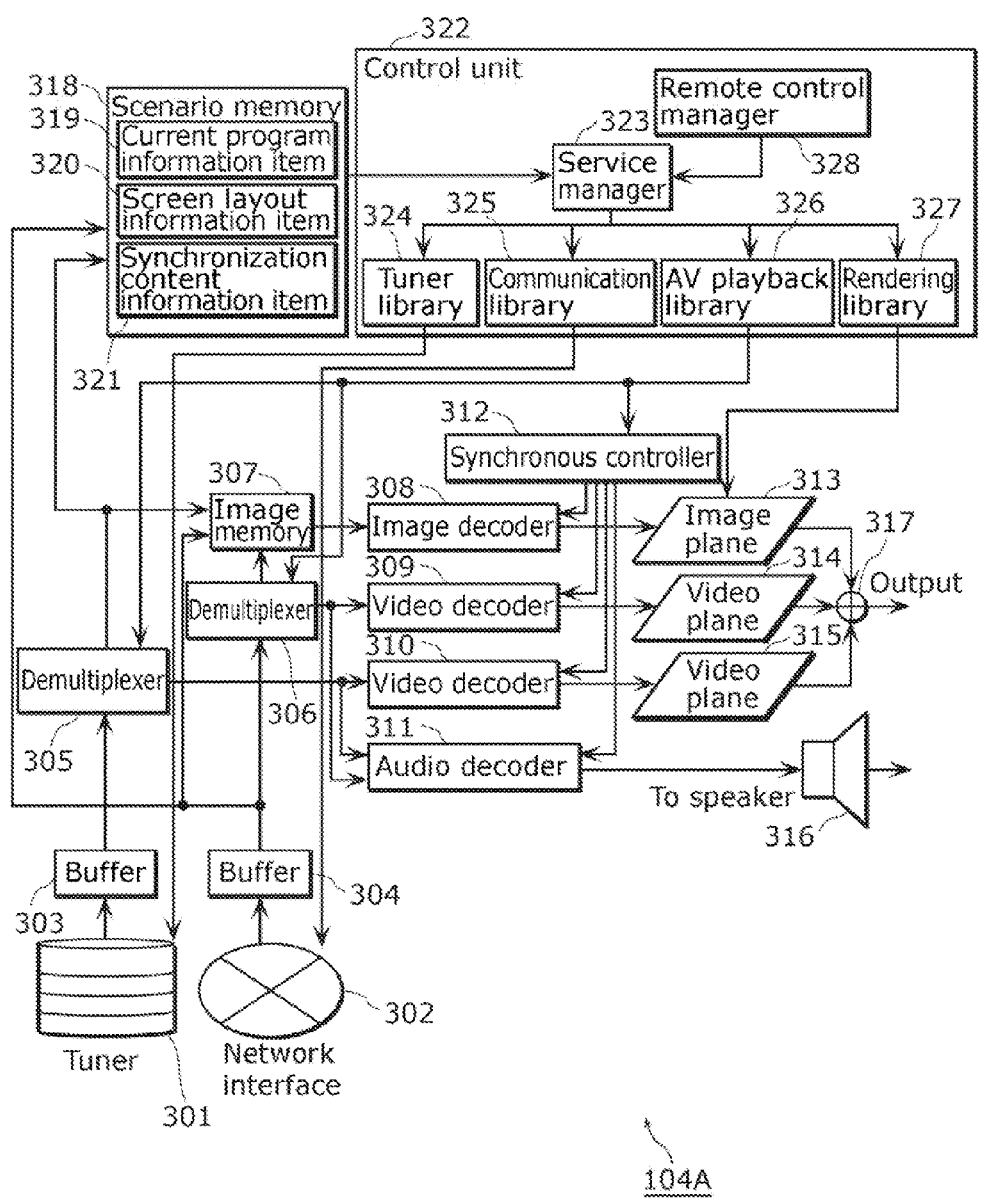
FIG. 13 is a block diagram illustrating an internal configuration of a broadcast receiving apparatus according to Embodiment 2.

FIG. 13 is a block diagram illustrating an internal configuration of a broadcast receiving apparatus according to Embodiment 2.

As illustrated in FIG. 13, a broadcast receiving apparatus 104A corresponds to one of the broadcast receiving apparatuses 10A to 10E according to Embodiment 1, and includes a tuner 301, a network interface 302, buffers 303 and 304, demultiplexers 305 and 306, an image memory 307, an image decoder 308, video decoders 309 and 310, an audio decoder 311, a synchronous controller 312, an image plane 313, video planes 314 and 315, a speaker 316, an adder 317, a scenario memory 318, and a control unit 322. The scenario memory 318 is a memory for storing a current program information item 319, a screen layout information item 320, and a synchronization content information item 321. The control unit 322 includes a service manager 323, a tuner library 324, a communication library 325, an AV playback library 326, a rendering library 327, and a remote control manager 328.

The tuner 301 receives broadcast waves, and accesses a broadcast content item. Accordingly, the tuner 301 receives the broadcast content item.

The network interface 302 is connected to the Internet connection 103, and receives a communication content item.

The buffer 303 is a memory for storing the broadcast content item received by the tuner 301.

The buffer 304 is a memory for storing the communication content item received by the network interface 302.

The demultiplexer 305 demultiplexes a transport stream included in the broadcast content item received by the tuner 301, and obtains information on broadcast programs, a video frame including a group of pictures (GOP), an audio frame, and image data such as a still image and subtitles. Furthermore, the demultiplexer 305 stores the information on broadcast programs in the scenario memory 318, outputs the video frame to the video decoder 310, and outputs the audio frame to the audio decoder 311. Furthermore, the demultiplexer 305 stores the image data in the image memory 307. The demultiplexing performed by the demultiplexer 305 includes transforming a transport stream (TS) packet into a packetized elementary stream (PES) packet.

The demultiplexer 306 demultiplexes the transport stream included in the communication content item received through the network interface 302, and obtains a video frame including a GOP, an audio frame, and image data such as a still image and subtitles. Furthermore, the demultiplexer 306 outputs the video frame to the video decoder 309, outputs the audio frame to the audio decoder 311, and stores the image data such as a still image and subtitles, in the image memory 307. The demultiplexing performed by the demultiplexer 306 includes transforming a TS packet into a PES packet.

The image memory 307 is a buffer for storing the image data such as a still image and subtitles that is read from the demultiplexer 305, the demultiplexer 306, or the buffer 304.

The image decoder 308 decodes the image data stored in the image memory 307, and writes the decoded image data (hereinafter referred to as an image) to the image plane 313. As a result of decoding the image data, the still image and subtitles appear on the display 203.

The video decoder 309 decodes the video frame output from the demultiplexer 306, and writes an uncompressed picture to the video plane 314.

The video decoder 310 decodes the video frame output from the demultiplexer 305, and writes an uncompressed picture to the video plane 315.

The audio decoder 311 decodes the audio frame output from the demultiplexer 305 or 306, and outputs uncompressed audio data.

The synchronous controller 312 controls the image decoder 308, the video decoders 309 and 310, and the audio decoder 311 so that the image, the video (pictures), and the audio data are output in synchronization with each other, using a time stamp for managing a time for decoding that is output from the demultiplexer 305 or 306.

The image plane 313 is a memory for storing an uncompressed image.

Each of the video planes 314 and 315 is a memory for storing an uncompressed picture.

The speaker 316 outputs voice data that is uncompressed audio data.

The adder 317 superimposes the uncompressed picture stored in the video plane 314 and the image stored in the image plane 313 on the uncompressed picture stored in the video plane 315, and outputs an image in which the pictures and the image are superimposed.

The scenario memory 318 is a memory for storing the current program information item 319, the screen layout information item 320, and the synchronization content information item 321.

The current program information item 319 is related to a program that is being played back, from among the program information items recorded in the buffer 303.

The screen layout information item 320 corresponds to the layout information 20 and the layout information 20a according to Embodiment 1, and is to be processed from among the screen layout information items stored in the buffer 303 or 304.

The synchronization content information item 321 corresponds to the synchronization information 21 according to Embodiment 1, and is to be processed from among the synchronization content information items stored in the buffer 303 or 304.

The control unit 322 is a microcomputer system including a ROM, a RAM, and a CPU, and a program for controlling the broadcast receiving apparatus 104A is recorded in the ROM. The functions of the service manager 323, the tuner library 324, the communication library 325, the AV playback library 326, the rendering library 327, and the remote control manager 328 are implemented by reading the program in the ROM into the CPU and with coordination between the program and hardware resources.

The service manager 323 obtains the current program information item 319 from the scenario memory 318, and tuning information including a frequency, using the tuner library 324. Furthermore, the service manager 323 obtains the screen layout information item 320 and the synchronization content information item 321 from the scenario memory 318. Furthermore, the service manager 323 causes the network interface 302 to obtain a communication content item (stream data and others) using the communication library 325. Furthermore, the service manager 323 implements a broadcast/communication integrating service by controlling the demultiplexers 305 and 306, the synchronous controller 312, and the image plane 313 using the AV playback library 326 and the rendering library 327.

The tuner library 324 obtains the tuning information such as a frequency, from the tuner 301.

The communication library 325 is used for downloading an additional broadcast content item published on the Internet. The additional broadcast content item is a content item that is not included in an original broadcast, and is, for example, an additional angle image, second sound channel, subtitles, special video, and an application program. The service manager 323 can download the additional broadcast content item published on the Internet to the buffer 304 or, for example, a local storage by controlling the communication library 325.

The AV playback library 326 implements an AV playback function in response to a function call from the service manager 323. Examples of the AV playback function include processes, such as starting playback, stopping playback, pause, canceling pause, canceling a still image function, playing back at a fast speed indicated by an immediate value, rewinding at a speed indicated by an immediate value, selecting voice, selecting a sub-image, and selecting an angle.

The rendering library 327 decodes the image data stored in the image memory 307 using the image decoder 308, and writes the decoded image data to the image plane 313. Furthermore, the rendering library 327 writes text or graphics to the image plane 313.

The remote control manager 328 transmits an input signal from a remote control communicated with the broadcast receiving apparatus 104A, to the service manager 323.

The screen layout information item 320 or the synchronization content information item 321 to be used by the broadcast receiving apparatus 104A according to Embodiment 2 may be obtained via the Internet, that is, the Internet connection 103. Here, information indicating a location of a communication content item may be included in broadcast waves, or placed on a website of the broadcast station 101.

Furthermore, the tuner 301, the buffer 303, the demultiplexer 305, and the video decoder 310 according to Embodiment 2 correspond to the broadcast content item receiving unit 11a according to Embodiment 1. Furthermore, the network interface 302, the buffer 304, the demultiplexer 306, and the video decoder 309 correspond to the communication content item receiving unit 11b according to Embodiment 1. Furthermore, the tuner 301 and the buffer 303 correspond to the layout information obtaining unit 12, the synchronization information obtaining unit 16, and the location information obtaining unit 18 according to Embodiment 1. Furthermore, the video plane 314 and the video plane 315 correspond to the first plane 13a and the second and 13b according to Embodiment 1, respectively. The synchronous controller 312 and the adder 317 correspond to the superimposing unit 14 according to Embodiment 1. Furthermore, the communication library 325 corresponds to the communication state obtaining unit 17 according to Embodiment 1.

Figure 14:
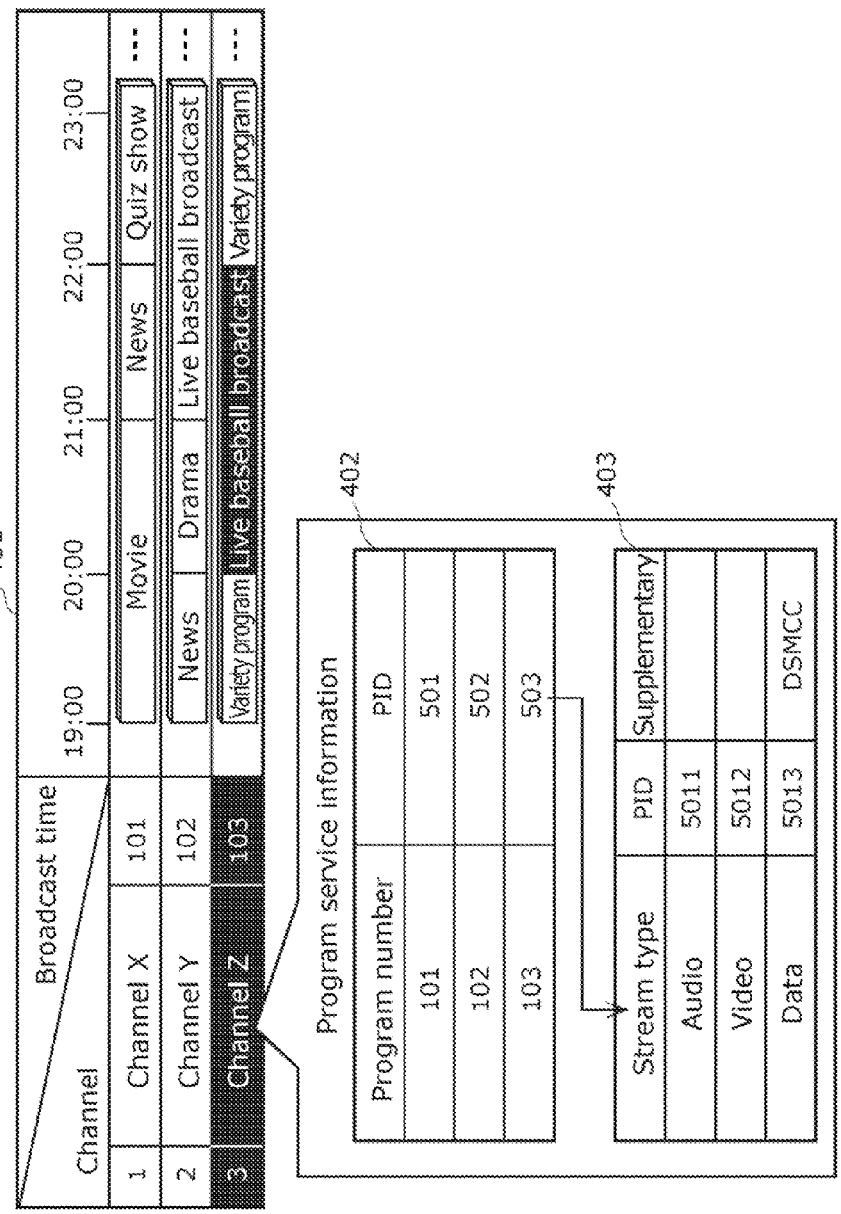
FIG. 14 illustrates an example of program list information according to Embodiment 2.

FIG. 14 illustrates an example of program list information.

Program list information 401 includes program information items stored in the buffer 303. The program list information 401 is arranged in table form, and includes channel identifiers, channel names, and program numbers. The program numbers are numbers for identifying a program map table (PMT) defined in the MPEG-2 standard.

Furthermore, the buffer 303 also stores program service information. The program service information includes a program association table (PAT) 402 and a program map table (PMT) 403 that are defined in the MPEG-2 standard. The PAT 402 indicates a program number and a packet ID (PID) for each broadcast program. The packet ID is used for obtaining the PMT 403. The PMT 403 is stored in the packet identified by the packet ID defined in the PAT 402, and is transmitted. The PMT 403 is composed of stream type, packet ID, and supplementary information. Each of audio, video, and data is referred to as an elementary stream, and includes packets transmitted with an identical ID. The supplementary information of the data indicates, for example, the digital storage media command and control (DSM-CC) written in ISOREC13818-6 that is a MPEG standard. Here, the details of DSM-CC will be omitted. DSM-CC defines a method for encoding a file system including directories and files used in a computer, in an MPEG-2 transport stream packet.

Figure 15:
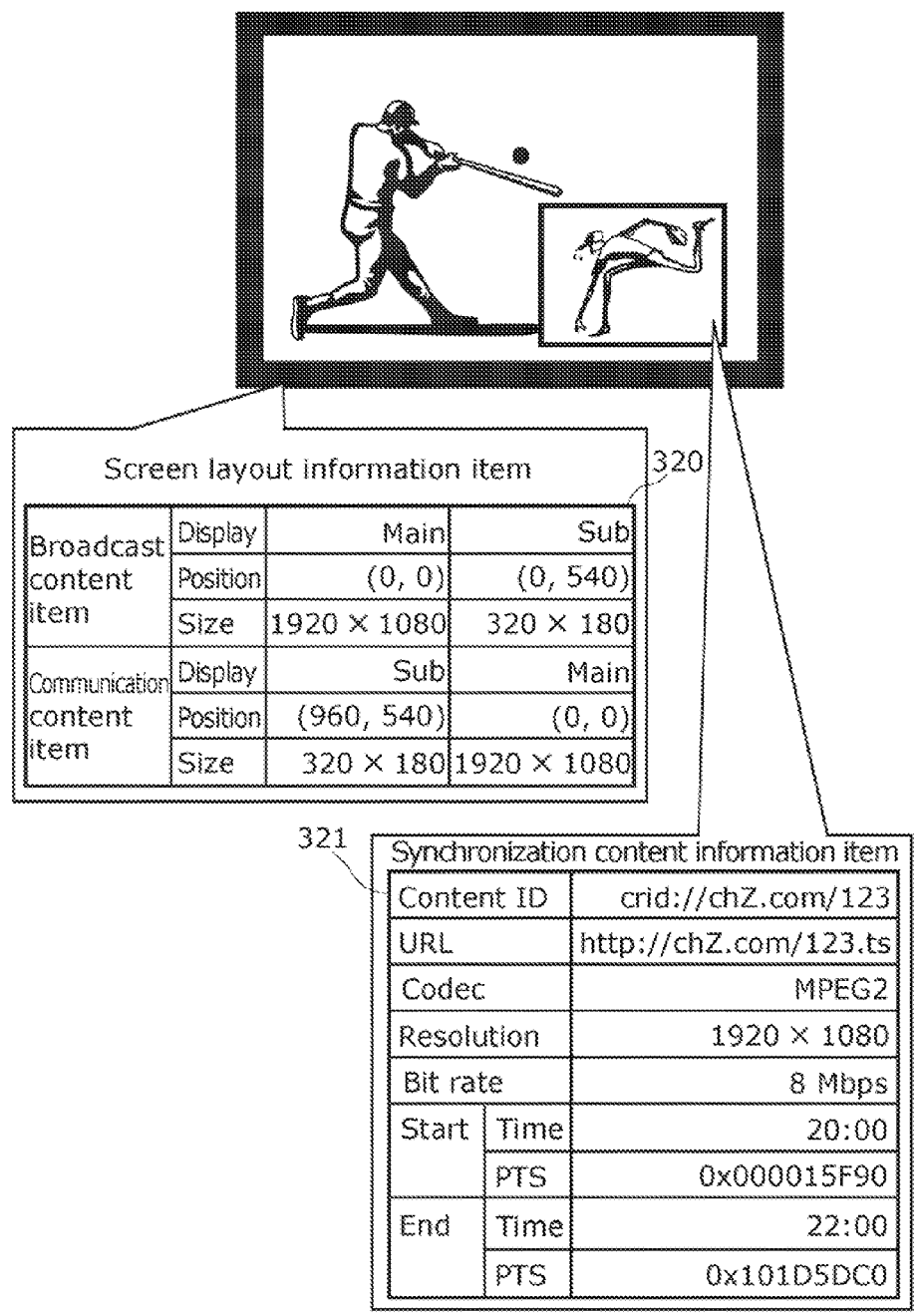
FIG. 15 illustrates an example of a screen layout information item and a synchronization content information item according to Embodiment 2.

FIG. 15 illustrates an example of a screen layout information item and a synchronization content information item.

The screen layout information item 320 indicates a position (display position) and a size (display size) of a broadcast content item, and a position (display position) and a size (display size) of a communication content item to be played back in synchronization with the broadcast content item for each display type. The display type is categorized into main or sub. One of the broadcast content item and the communication content item is main, and the other is sub. For example, the main is a content item whose video is larger and is displayed behind, and the sub is a content item whose video is smaller and is displayed in front. According to Embodiment 2, although the screen layout information item 320 indicates (i) a first layout using a broadcast content item as main and a communication content item as sub and (ii) a second layout using a communication content item as main and a broadcast content item as sub, the screen layout information item 320 may indicate only one of the first layout and the second layout. Furthermore, when the screen layout information item 320 indicates the first layout and the second layout, the broadcast receiving apparatus 104A according to Embodiment 2 may select the first layout by default.

The synchronization content information item 321 indicates a content ID for identifying a communication content item, a URL indicating a location of the communication content item, a type of codec, a resolution, a bit rate, a start time, a start program time stamp (PTS), an end time, and an end PTS. The synchronization content information item 321 is broadcast, for example, with a broadcast content item. Thus, the content ID is associated with a broadcast content item and a communication content item. The broadcast receiving apparatus 104A identifies a source of a communication content item by a URL, and detects an attribute of the communication content item by the type of codec, resolution, and bit rate. Furthermore, the broadcast receiving apparatus 104A detects a relationship between a playback period and a playback time of a communication content item and a position of data in a stream included in the communication content item, using the start time, start PTS, end time, and end PTS. The screen layout information item 320 or the synchronization content information item 321 may be superimposed on broadcast waves (for example, in a file system of DSM-CC), or placed in the server 102. When these information items are placed in the server 102, only link information for linking to the server 102 may be superimposed on broadcast waves. The coordinate system of a position indicated by the screen layout information item 320 is not limited to an absolute coordinate system but may be a relative coordinate system. The synchronization content information item 321 may indicate types of codec, resolutions, and bit rates. In other words, the synchronization content information item 321 may indicate a content ID, a URL, and a type of codec for each communication content item.

Figure 16:
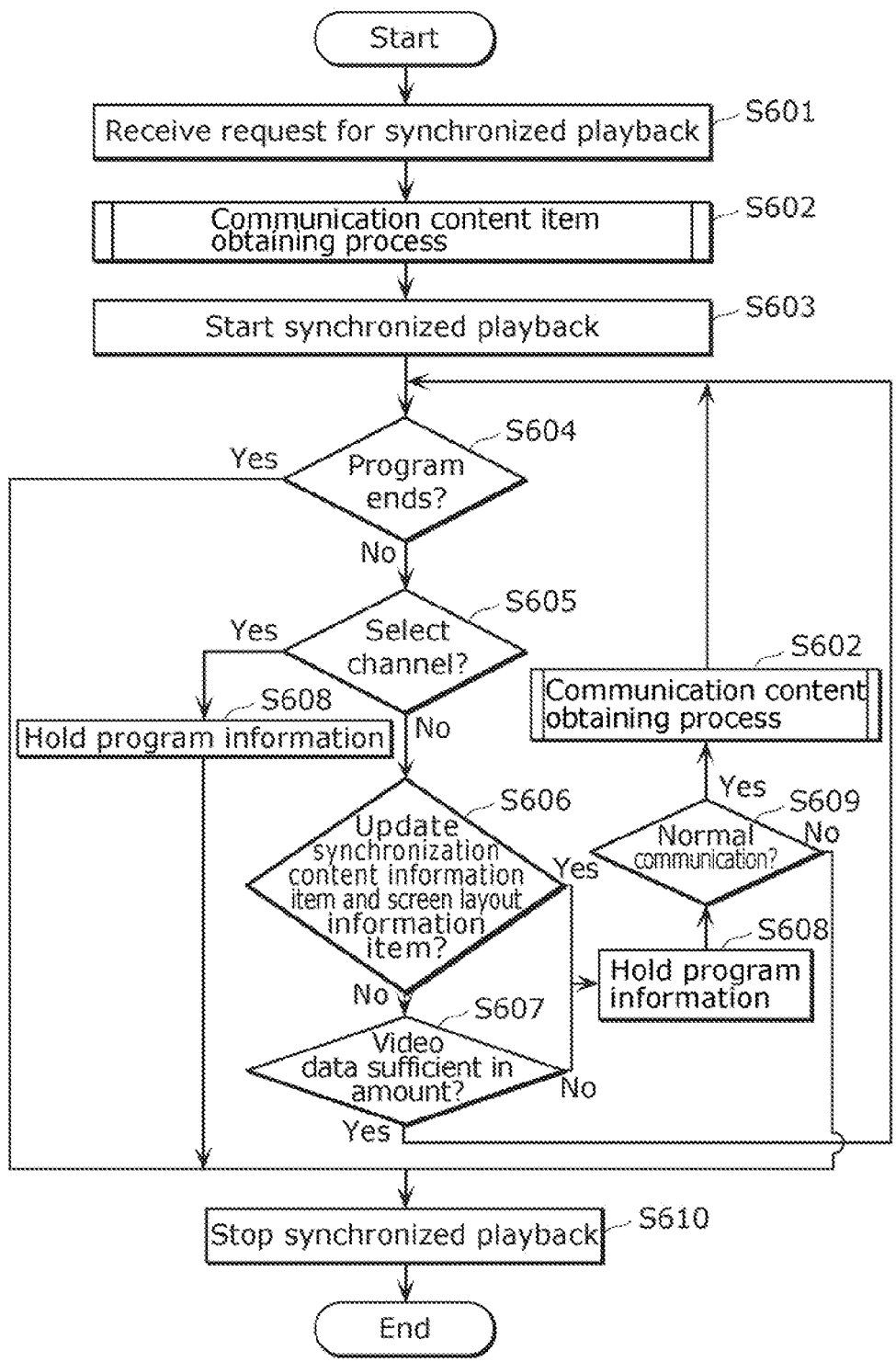
FIG. 16 is a flowchart indicating processes in which the broadcast receiving apparatus according to Embodiment 2 plays back a broadcast content item and a communication content item in synchronization with each other.

FIG. 16 is a flowchart indicating processes in which the broadcast receiving apparatus 104 plays back a broadcast content item and a communication content item in synchronization with each other.

First, when a user views a broadcast content item that is a broadcast program, in response to a remote control operation by the user, the broadcast receiving apparatus 104A receives a request for synchronized playback of the broadcast content item and a communication content item (Step S601). Accordingly, the remote control manager 328 transmits, to the service manager 323, remote control key information indicating the request for synchronized playback. Upon receipt of the remote control key information, the service manager 323 starts obtaining the communication content item using the communication library 325, that is, starts a communication content item obtaining process (Step S602). The details of the communication content item obtaining process will be described later.

When obtaining a data amount of the communication content item sufficient for synchronized playback of the broadcast content item and the communication content item, the service manager 323 specifies, for the AV playback library 326, a display size of the communication content item that is indicated by the screen layout information item 320 and requests the AV playback library 326 to play back the communication content item. The AV playback library 326 causes the synchronous controller 312 to match the PTS included in the broadcast content item and the PTS included in the communication content item, write the pictures included in the communication content item and the broadcast content item to the video plane 314 and the video plane 315, respectively, and superimpose and output an image in which the pictures are superimposed (Step S603). Accordingly, the synchronized playback of the broadcast content item and the communication content item starts.

When the synchronized playback of the broadcast content item and the communication content item starts, the service manager 323 monitors whether or not the current time is the end time of the broadcast program that is the broadcast content item (Step S604). When it is determined at Step S604 that the current time is not the end time of the broadcast content item (No at Step S604), the service manager 323 monitors whether or not the user switches (selects) a channel (Step S605). When it is determined at Step S605 that the user does not switch a channel (No at Step S605), the service manager 323 further checks whether or not at least one of the screen layout information item 320 and the synchronization content information item 321 is updated (Step S606). When it is determined at Step S606 that the screen layout information item 320 and the synchronization content information item 321 are not updated (No at Step S606), the service manager 323 further checks whether or not video data of each of the broadcast content item and the communication content item is sufficient in amount for synchronized playback (Step S607). When it is determined at Step S607 that the video data of each of the broadcast content item and the communication content item is sufficient in amount for synchronized playback (Yes at Step S607), the service manager 323 repeats the processes from Step S604.

When it is determined at Step S606 that at least one of the screen layout information item 320 and the synchronization content information item 321 is updated (Yes at Step S606) or it is determined at Step S607 that the video data of each of the broadcast content item and the communication content item is not sufficient in amount for the synchronized playback (No at Step S607), the service manager 323 holds the program information of the broadcast content item that is being played back in synchronization with the communication content item, in a memory (Step S608). Furthermore, the service manager 323 checks whether or not the communication state is normal then (Step S609). When it is determined at Step S609 that the communication state is normal (Yes at Step S609), the service manager 323 performs the communication content item obtaining process at Step S602 and repeats the processes from Step S604. When it is determined at Step S609 that the communication state is abnormal, the service manager 323 immediately stops the synchronized playback of the broadcast content item and the communication content item (Step S610). Alternatively, the service manager 323 may temporarily prevent the communication content item from being output from the video plane 314. Once the communication state is back to the normal state, the service manager 323 may again obtain the communication content item and cause the video plane 314 to output the communication content item.

When only one of the communication content item obtained at Step S602 and the broadcast content item received at Step S603 has an audio frame or image data, the broadcast receiving apparatus 104A decodes and outputs the audio frame or the image data. When bath of the communication content item and the broadcast content item have an audio frame or image data, the broadcast receiving apparatus 104A recognizes one of the content items as a content item to be processed, during the synchronized playback at Step S603. Then, the broadcast receiving apparatus 104A decodes and outputs the audio frame or the image data included in the content item to be processed. For example, the broadcast receiving apparatus 104A recognizes a content item according to predetermined details (for example, language), as a content item to be processed. Alternatively, the broadcast receiving apparatus 104A may recognize a content item to be processed, based on control information indicating whether or not an image is output in parallel with the synchronized playback or based on information indicating details of the content item to be processed. Furthermore, the broadcast receiving apparatus 104A may recognize a content item to be processed according to the display size of a video represented by each of a communication content item and a broadcast content item.

Furthermore, when it is determined at Step S604 that the current time is the end time of the broadcast content item (Yes at Step S604), or when it is determined at Step S609 that the communication state is abnormal (No at Step S609), the service manager 323 stops playing back the communication content item (Step S610).

In the flowchart of FIG. 16, when a channel is switched or a broadcast content item ends, the broadcast receiving apparatus 104A of the TV 104 automatically stops the communication content item. However, even in such a case, the TV 104 may continue to play back a broadcast content item that is another broadcast program. When a communication content item corresponding to the other broadcast program is present, it may continue to play back the broadcast content item and the communication content item in synchronization with each other. When authentication for billing and others are necessary in viewing a communication content item, the TV 104 may temporarily suspend playback of the communication content item and again play back the communication content item after completion of the user authentication.

Figure 17:
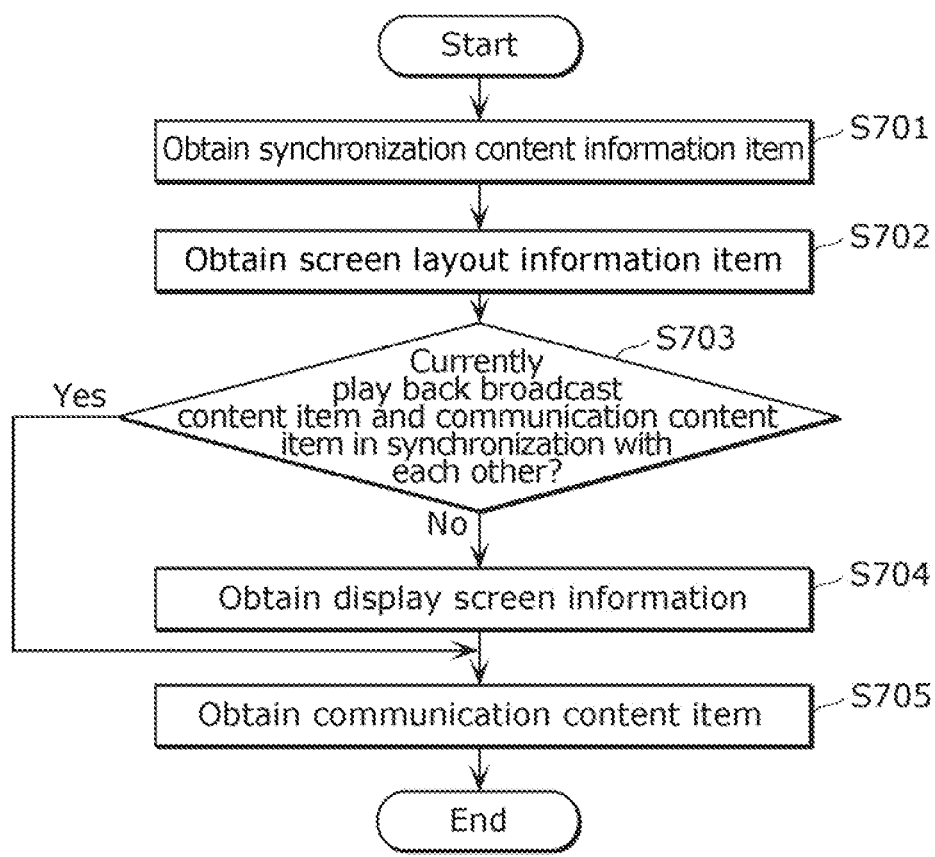
FIG. 17 is a flowchart indicating details of a communication content item obtaining process according to Embodiment 2.

FIG. 17 is a flowchart indicating details of the communication content item obtaining process at Step S602 in FIG. 16.

First, the broadcast receiving apparatus 104A of the TV 104 obtains the synchronization content information item 321 superimposed on the broadcast waves (Step S701), and further obtains the screen layout information item 320 (Step S702). Next, the broadcast receiving apparatus 104A checks whether or not the broadcast content item and the communication content item are currently played back in synchronization with each other (Step S703). When it is determined at Step S703 that the broadcast content item and the communication content item are not currently played back in synchronization with each other (No at Step S703), the broadcast receiving apparatus 104A obtains display screen information indicating, for example, a resolution and a display size of the display 203 of the TV 104 (Step S704). Here, the synchronization content information item 321 obtained at Step S701 indicates video information, such as a bit rate for each of the communication content items. Here, the broadcast receiving apparatus 104A obtains the optimal communication content item, based on the synchronization content information item 321 obtained at Step S701, the screen layout information item 320 obtained at Step S702, and the display screen information obtained at Step S704 (Step S705). For example, the broadcast receiving apparatus 104A obtains a communication content item having the minimum definition (video information) described in the synchronization content information item 321, according to the display size of the display 203. When it is determined at Step S703 that the broadcast content item and the communication content item are currently played back in synchronization with each other (Yes at Step S703), the broadcast receiving apparatus 104A obtains the communication content item with high definition described in the synchronization content information item 321 (Step S705). However, the broadcast receiving apparatus 104A may change the definition of the communication content item obtained at Step S705, according to a load or a communication state.

Accordingly, it is possible to shorten a time period from a request for synchronized playback of the broadcast content item and the communication content item, according to an instruction of the user to start of the playback. Furthermore, when the communication content item is displayed in full screen mode during the synchronized playback of the broadcast content item and the communication content item, the content items with high definition can be presented to the user. The automatic recovery of resources of a communication content item according to a state of a broadcast content item allows assignment of resources to another service. When an error occurs in a communication content item, it is possible to prevent an inappropriate image from being presented to the user. Furthermore, Embodiment 2 can produce the same advantages as those of Embodiment 1.

(Variation 1)

Variation 1 of Embodiment 2 will be hereinafter described. The synchronization content information item 321 according to Variation 1 indicates a broadcast type of a broadcast content item to be played back in synchronization with a communication content item. When obtaining the synchronization content information item 321, the broadcast receiving apparatus 104A according to Variation 1 performs playback according to the broadcast type.

FIG. 18 shows an example of the synchronization content information item 321 according to Variation 1.

The synchronization content information item 321 indicates a content ID and a URL of a communication content item, and a broadcast type 801 of a broadcast content item to be played back in synchronization with the communication content item. Specifically, the broadcast type 801 is a live broadcast (live) or an on-demand broadcast (video).

Figure 19:
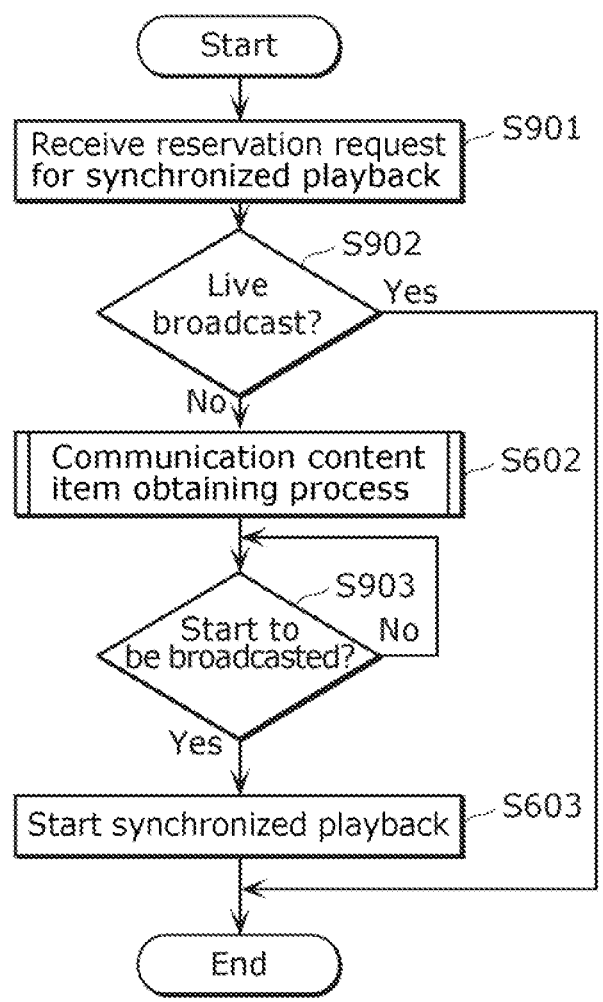
FIG. 19 is a flowchart indicating playback processes performed by a broadcast receiving apparatus according to Variation 1 of Embodiment 2.

FIG. 19 is a flowchart indicating playback processes performed by the broadcast receiving apparatus 104A according to Variation 1, using the broadcast type 801.

The broadcast receiving apparatus 104A first receives a reservation request for synchronized playback (Step S901). In other words, the user operates the TV 104 with reference to, for example, the program information to reserve automatic start of the broadcast content item and the communication content item. The broadcast receiving apparatus 104A checks whether or not the broadcast type 801 of the synchronization content information item 321 is a live broadcast (Step S902). Here, when it is determined at Step S902 that the broadcast type 801 is not a live broadcast (No at Step S902), the broadcast receiving apparatus 104A performs the communication content item obtaining process at Step S602. Here, when there is plenty of time until start of broadcasting of the broadcast content item, the broadcast receiving apparatus 104A may obtain a communication content item having high definition (quality).

After obtaining the communication content item with a data amount sufficient for synchronized playback, the broadcast receiving apparatus 104A monitors whether or not the broadcast program that is the broadcast content item starts to be broadcast (Step S903). When it is determined at Step S903 that the broadcast program starts to be broadcast (Yes at Step S903), the broadcast receiving apparatus 104A starts the synchronized playback at Step S603, that is, synchronized playback of the broadcast content item and the communication content item. When it is determined at Step S903 that the broadcast program does not start to be broadcast (No at Step S603), the broadcast receiving apparatus 104A waits until the broadcast program starts to be broadcast.

With pre-obtainment of data of a communication content item according to a type of a broadcast content item, the broadcast receiving apparatus 104A can play back the broadcast content item in synchronization with the communication content item, simultaneously when the broadcast content item starts to be broadcast.

The broadcast receiving apparatus 104A may play back the broadcast content item and the communication content item as 3D images, with synchronized playback of these content items. The playback is referred to as 3D playback or 3D display. For example, when an output device of the TV 104 supports 3D, the broadcast receiving apparatus 104A performs the 3D playback by outputting a broadcast content item as right-eye data and a communication content item as left-eye data. Here, the synchronization content information item 321 indicates that the broadcast content item and the communication content item that correspond to the synchronization content information item 321 are content items for 3D playback. Accordingly, the broadcast receiving apparatus 104A can preset the output for 3D playback (setting for alternately outputting right-eye data and left-eye data).

Furthermore, when data of a communication content item cannot be received due to a communication error at the time of 3D playback, the user may feel uncomfortable viewing an image displayed in the output setting for 3D playback. In such a case, the broadcast receiving apparatus 104A outputs the broadcast content item written in the video plane twice. Accordingly, the image to be displayed is visually recognized as a 2D image, and it is possible to lessen the uncomfortable feeling. Here, the broadcast receiving apparatus 104A may notify the user of switching to a 2D image due to a communication error in advance. Accordingly, the user can easily understand switching to a 2D image. Once the communication state is back from the abnormal state to the normal state, the broadcast receiving apparatus 104A resumes playback of a communication content item. In other words, the broadcast receiving apparatus 104A performs the 3D playback by alternately outputting the broadcast content item written in one of the video planes and the communication content item written in the other video plane. Furthermore, when the communication content item cannot be received due to a communication error or others and the 3D playback is interrupted midstream, the broadcast receiving apparatus 104A holds the time at which the 3D playback has been interrupted. When the broadcast receiving apparatus 104A is back to a state capable of receiving a communication content item, it may resume the 3D playback from the image at the held time that is an image missed by the user.

Furthermore, there are cases where the user turns ON the TV 104 after the broadcast start time and misses a beginning portion of the broadcast content item, or where the user vacates the seat during a broadcast and misses the broadcast content item for a predetermined period. In such a case, the broadcast receiving apparatus 104A of the TV 104 may obtain and play back a communication content item having the same details as those of the broadcast content item. Accordingly, the broadcast receiving apparatus 104A may be available as an alternative playback means when the user misses a content item. When the user misses the beginning portion, the broadcast receiving apparatus 104A obtains and plays back a communication content item that corresponds to the broadcast start position and is the beginning portion. Since it is not necessary to view a content item played back at a normal speed (single-speed playback) depending on a type of the content item, the communication content item can be viewed by being played back at a faster speed enough to listen to the voice.

When a playback position of the communication content item reaches a playback position of the broadcast content item during playback of the communication content item at the faster speed, the broadcast receiving apparatus 104A replaces the playback of the communication content item with the playback of the broadcast content item or automatically restores the playback speed of the communication content item to the normal playback speed. Furthermore, when the user vacates the seat during the broadcast, the user notifies the TV 104 that the user cannot temporarily view any broadcast content through a remote control operation or others. Here, the broadcast receiving apparatus 104A of the TV 104 holds the time at which the notification is received. Then, when the user returns to the seat, the user notifies the TV 104 that the user desires to view the broadcast content item again through a remote control operation or others. Accordingly, the broadcast receiving apparatus 104A of the TV 104 may obtain a communication content item corresponding to the broadcast content item at the held time through communication, and play back the communication content item at a faster speed as described above. Furthermore, the broadcast receiving apparatus 104A may search a broadcast content item for a particular scene and display the scene, or enlarge a part of the scene.

The broadcast receiving apparatus 104A may relay-broadcast a broadcast content item and a communication content item in coordination with each other. For example, there are cases where during the time when the user views a night baseball game that is being broadcast live, although the baseball game is actually continued, the broadcast is discontinued. Here, the broadcast receiving apparatus 104A obtains and plays back a communication content item as a continuation of the broadcast (broadcast content item). Furthermore, when superimposing smaller moving images of the communication content item in front of larger moving images of the broadcast content item and outputting the moving images, once the broadcast ends, the broadcast receiving apparatus 104A may change the display size of the communication content item to the full screen size and continuously play back the communication content item as a continuation of the broadcast.

(Variation 2)

Variation 2 of Embodiment 2 will be hereinafter described.

A broadcast receiving apparatus according to Variation 2 changes a layout of a broadcast content item and a communication content item to be superimposed, according to an operation by the user. In other words, the broadcast receiving apparatus rearranges positions of the broadcast content item and the communication content item according to the screen layout information item 320 and the operation by the user, and displays the content items. For example, in a live baseball broadcast, a broadcast content item of a video captured from a center back screen is broadcast, and a communication content item of a video focusing on only a favorite player of the user is uploaded to the server 102. Here, assume that the user desires to view the respective content items by displaying not the broadcast content item but the communication content item in full screen mode as main and the broadcast content item on a sub-screen as sub. Then, the user operates the broadcast receiving apparatus through a remote control, for example, to rearrange the positions of the broadcast content item and the communication content item. In other words, the user can display larger moving images of the communication content item behind, and smaller moving images of the broadcast content item in front as desired.

Figure 20:
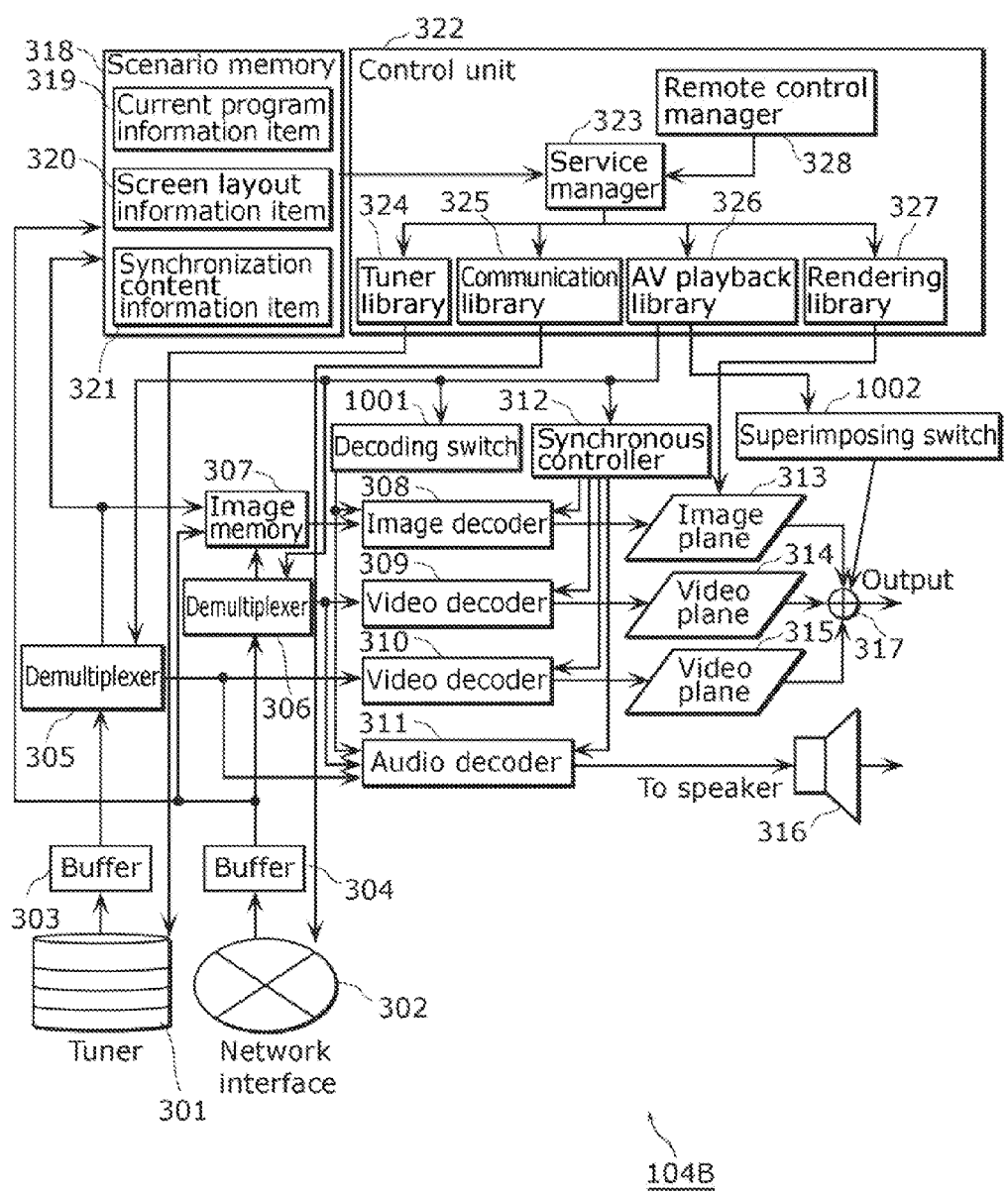
FIG. 20 illustrates an internal configuration of a broadcast receiving apparatus according to Variation 2 of Embodiment 2.

FIG. 20 is a block diagram illustrating an internal configuration of the broadcast receiving apparatus according to Variation 2 of Embodiment 2.

As illustrated in FIG. 20A, a broadcast receiving apparatus 104B according to Variation 2 includes all the constituent elements included in the broadcast receiving apparatus 104A according to Embodiment 2, and additionally includes a decoding switch 1001 and a superimposing switch 1002.

The decoding switch 1001 controls the image decoder 308 and the audio decoder 311. Accordingly, the decoding switch 1001 switches between decoding the image data and the audio frame included in the broadcast content item and decoding the image data and the audio frame included in the communication content item. The superimposing switch 1002 switches a superimposing order of pictures and images held in each of the planes, according to the screen layout information item 320 and an operation by the user. According to Variation 2 herein, the remote control manager 328 corresponds to the instruction receiving unit 15 according to Embodiment 1.

Figure 21:
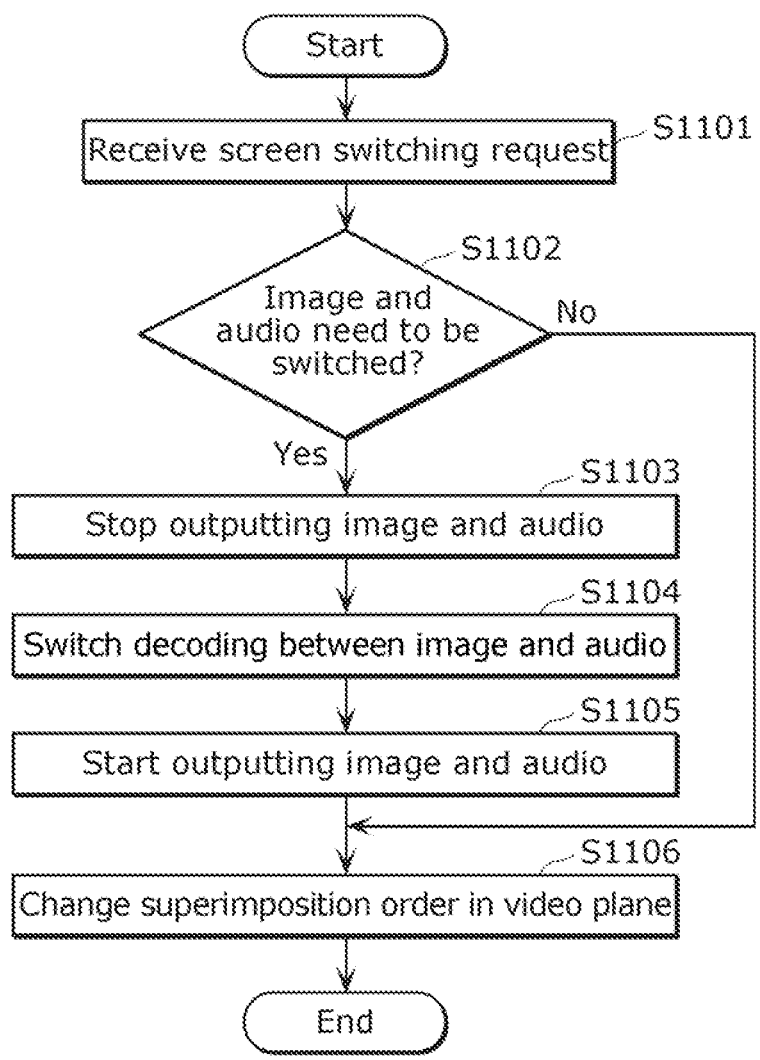
FIG. 21 is a flowchart indicating an example of changing a layout (switching a superimposing order) to be performed by the broadcast receiving apparatus according to Variation 2 of Embodiment 2.

FIG. 21 is a flowchart indicating an example of changing the layout, that is, switching the superimposing order to be performed by the broadcast receiving apparatus 104B according to Variation 2.

The broadcast receiving apparatus 104B according to Variation 2 receives a screen switching request according to an instruction of the user (Step S1101). The screen switching request is a request for switching assignment between the main and the sub for the broadcast content item and the communication content item. Furthermore, the broadcast receiving apparatus 104B checks whether or not the image data and the audio frame that are to be decoded also need to be switched (Step S1102). When it is determined at Step S1102 that the image data and the audio frame also need to be switched (Yes at Step S1102), the broadcast receiving apparatus 104B stops decoding and outputting the image data and the audio frame that are included in one of the broadcast content item and the broadcast content item and are currently decoded and output (Step S1103). Then, the AV playback library 326 requests the decoding switch 1001 to decode the image data and the audio frame that are included in another content item and are not decoded (Step S1104). Accordingly, the image data and the audio frame that are to be decoded are switched.

Next, the broadcast receiving apparatus 104B starts decoding and outputting the image data and the audio frame that have been switched and are to be decoded (Step S1105). Then, the broadcast receiving apparatus 104B switches between the superimposition order of the picture of the broadcast content item written in one of the video planes and the superimposition order of the picture of the communication content item written in the other video plane (Step S1106).

Accordingly, switching between the main and the sub allows the user to simultaneously view the communication content item as main and the broadcast content item as sub, and seamlessly switch the video display.

Since it is highly likely that communication is more interrupted and unstable than broadcasting, there are cases where a communication content item is missed during the time when the communication content item is displayed in full screen mode. Here, the broadcast receiving apparatus 104B may present the state to the user and display the broadcast content item in full screen mode. When the communication content item is secured, the broadcast receiving apparatus 1048 may automatically restore the display size of the broadcast content item to the original state.

Although the superimposing switch 1002 according to Variation 2 switches the superimposition order using the adder 317, the main and the sub may be switched by switching between the video planes to which the broadcast content item and the communication content item are to be written.

(Variation 3)

Variation 3 of Embodiment 2 will be hereinafter described.

The synchronization content information item 321 according to Variation 3 indicates information on interlocking data to be interlocked with a communication content item and displayed. When obtaining the synchronization content information item 321, the broadcast receiving apparatus 104A according to Variation 3 performs playback according to the information on the interlocking data.

FIG. 22 shows an example of the synchronization content information item 321 according to Variation 3.

The synchronization content information item 321 indicates a content ID and a URL of a communication content item, and further information 1201 on the interlocked data to be interlocked with the communication content item and displayed. Specifically, the information 1201 is information for enabling automatic playback or output of the interlocking data, such as the image data, at a designated time to be interlocked with the communication content item. The broadcast receiving apparatus 104A obtains the interlocking data identified by the name indicated in the information 1201 at the time indicated in the information 1201 through broadcasting or the Internet connection 103, and plays back or outputs the interlocking data. The interlocking data includes a still image, subtitles, and sound effect, and is, for example, played back in synchronization with video data of a communication content item on a per frame unit basis.

(Variation 4)

The broadcast receiving apparatus 104A according to Variation 4 not only superimposes a single communication content on a broadcast content item and displays the content items, but also a plurality of communication content items on a broadcast content item and displays the content items. For example, in a live baseball broadcast, a broadcast content item of a video captured from a center back screen is broadcast, and a communication content item of a video including respective captured images of pitchers, catchers, fielders, and cheerleaders are uploaded to the server 102. The server 102 edits the uploaded communication content items into one communication content item, and distributes the communication content tem. Here, the broadcast receiving apparatus 104A sets the broadcast content item as main, and displays the video of the broadcast content item in full screen mode. Furthermore, the broadcast receiving apparatus 104A sets the communication content item as sub, and displays the video of the communication content item that is the video of the pitchers, catchers, fielders, and cheerleaders with a smaller display size.

Figure 23:
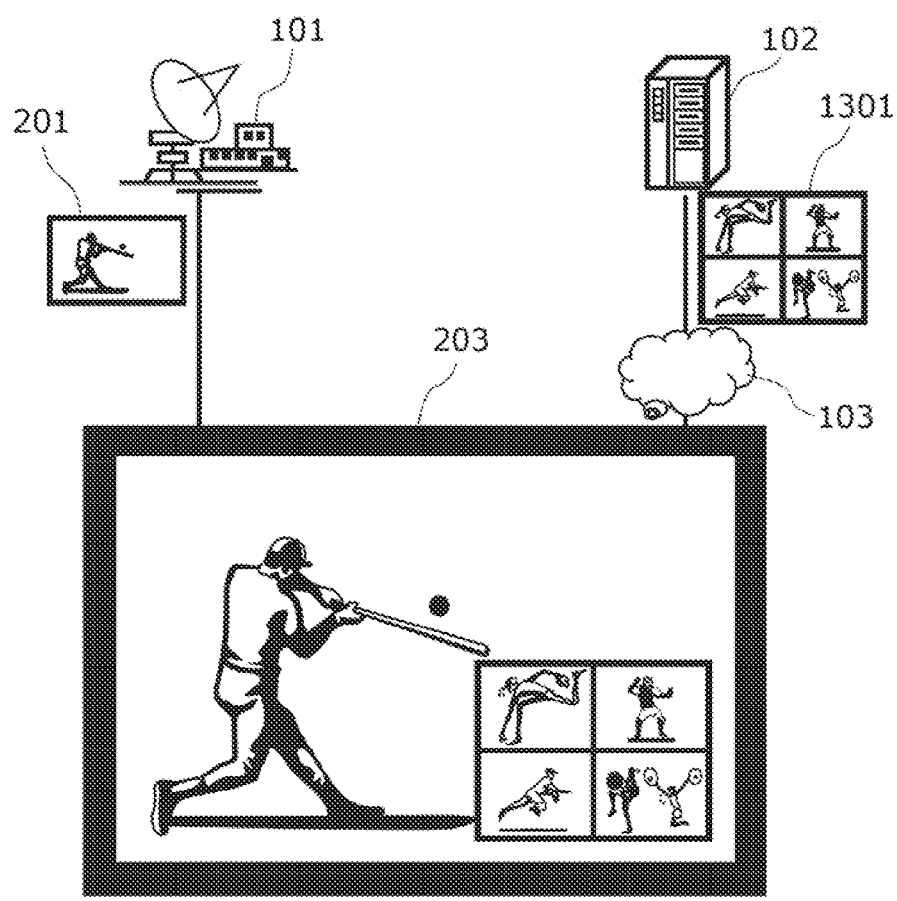
FIG. 23 illustrates an example of a PiP image to be displayed by a broadcast receiving apparatus according to Variation 4 of Embodiment 2.

FIG. 23 illustrates an example of a PiP image to be displayed by the broadcast receiving apparatus 104A according to Variation 4.

For example, synchronized playback of a broadcast content item and a communication content item enables multi-angle viewing of a baseball game live. The broadcast receiving apparatus 104A receives (i) a broadcast content item 201 to be broadcast from the broadcast station 101, and (ii) a communication content item 1301 to be distributed from the server 102 via the Internet connection 103. Then, the broadcast receiving apparatus 104A superimposes a broadcast video of the broadcast content item 201 and a communication video of the communication content item 1301, and outputs an image in which the broadcast video and the communication video are superimposed, to the display 203. The broadcast content item 201 indicates the broadcast video that is the video captured from an angle of a batter, and the communication content item 1301 indicates the broadcast video that is the video of a pitcher, a catcher, a fielder, and cheerleaders. As such, the communication content item complements elements that cannot be expressed solely by the broadcast content item, thus conveying to the viewer a greater sense of realism.

FIG. 24 shows an example of the synchronization content information item 321 according to Variation 4.

The synchronization content information item 321 according to Variation 4 indicates the details included in the synchronization content information item of FIG. 15 according to Embodiment 2 and additionally indicates a data type 1401, the number of screens 1402, and video regions 1403.

The data type 1401 is a type of a communication content item corresponding to the synchronization content information item 321. Specifically, the data type 1401 is one of (i) a type of a communication content item to be generated by editing video streams into one video stream and superimposed on a broadcast content item (this type is, for example, referred to as "thumbnail"), (ii) a type of a communication content item which is composed of one video stream and is to be superimposed on a broadcast content item (this type is, for example, referred to as "angle display"), and (iii) a type of a communication content item to be three-dimensionally displayed together with the broadcast content item (this type is, for example, referred to as "3D display"). The number of screens 142 is the number of video streams included in a communication content item to be thumbnailed. The video regions 1403 are display regions of respective video streams included in the communication content item to be thumbnailed.

According to Variation 4, when the type of a communication content item (data type 1401) is thumbnail, one communication content includes video streams. Thus, even when only one video decoder and one video plane are allocated to the communication content item, images of the video streams obtained through communication can be simultaneously displayed. However, when the broadcast receiving apparatus 104A includes resources, such as video decoders and video planes for communication content items, the same advantages can be obtained by obtaining communication content items and decoding the respective communication content items. Alternatively, the same advantages can be obtained by obtaining video streams from each of a broadcast content item and a communication content item using simulcasting, and decoding the respective video streams.

(Variation 5)

Variation 5 of Embodiment 2 will be hereinafter described.

A broadcast receiving apparatus according to Variation 5 obtains not only the screen layout information item 320 and the synchronization content information item 321 but also an application program (hereinafter referred to as "application"). In other words, the broadcast receiving apparatus according to Variation 5 plays back a broadcast content item and a communication content item in synchronization with each other according to the application. Accordingly, broadcasters and telecommunications carriers which distribute an application can set processing against a communication error to the broadcast receiving apparatus according to Variation 5.

Figure 25:
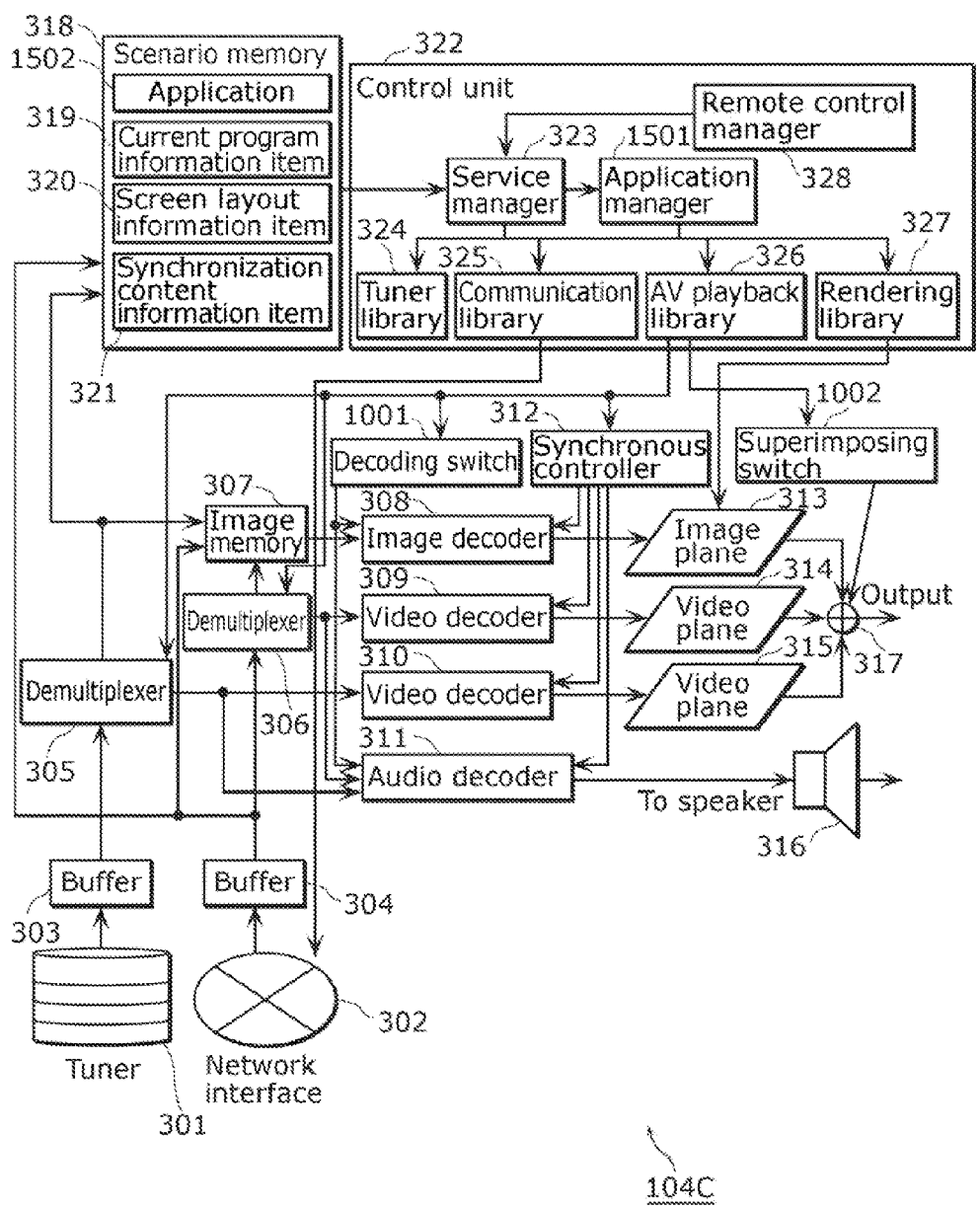
FIG. 25 illustrates an internal configuration of a broadcast receiving apparatus according to Variation 5 of Embodiment 2.

FIG. 25 is a block diagram illustrating an internal configuration of a broadcast receiving apparatus according to Variation 5.

A broadcast receiving apparatus 104C according to Variation 5 includes all the constituent elements included in the broadcast receiving apparatus 104A according to Embodiment 2, and additionally includes an application manager 1501. The application manager 1501 manages starting up and closing of an application 1502 superimposed on broadcast waves with DSM-CC. Alternatively, the application manager 1501 obtains the application 1502 superimposed on the broadcast waves through communication, using location information of the application 1502, and manages starting up and closing of the application 1502. Here, the obtained application 1502 is stored in the scenario memory 318, and the application manager 1501 is included in the control unit 322. Then, the application manager 1501 reads the application 1502 stored in the scenario memory 318, and starts up and closes the application 1502.

The language of the application 1502 may be any. In other words, the application 1502 may be written in Java®, HTML, or BML. The service manager 323 of the broadcast receiving apparatus 104C notifies the application 1502 of a communication error or update of the screen layout information item 320 or the synchronization content information item. Furthermore, the service manager 323 of the broadcast receiving apparatus 104C may instruct the application 1502 to play back the broadcast content item and the communication content item in synchronization with each other, obtain a communication content item with a designated bit rate or resolution, obtain the screen layout information item 320 or the synchronization content information item 321, obtain the display screen information, switch between the broadcast content item and the communication content item, or present a switching function between display and non-display.

Although the broadcast receiving apparatus according to one or more aspects of the present invention is described based on Embodiments and Variations, the present invention is obviously not limited by these Embodiments and Variations. Without departing from the scope of the present invention, the aspects of the present invention include an embodiment with some modifications on Embodiments that are conceived by a person skilled in the art, and another embodiment obtained through combinations of the constituent elements of different Embodiments.

Furthermore, the present invention may be a computer program including a program code that operates a computer, or a digital signal including the computer program. In other words, each of the constituent elements according to each of Embodiments 1 and 2 may be implemented by dedicated hardware or by executing a software program appropriate for the constituent element. Each of the constituent elements may be implemented by a program executing unit, such as a CPU and a processor, reading and executing the software program recorded on a recording medium, such as a hard disk and a semiconductor memory.

Here, the software that implements the broadcast receiving apparatus according to each of Embodiments 1 to 2 is the following program. In other words, the program is a program for receiving a broadcast content item to be broadcast, and causes a computer to execute: receiving a communication content item that is distributed through communication other than broadcasting and is related to the broadcast content item; receiving the broadcast content item; holding, in a plane, a picture of a broadcast video that is a video represented by the broadcast content item, and a picture of a communication video that is a video represented by the communication content item; obtaining layout information from outside of the broadcast receiving apparatus, the layout information indicating a layout of the broadcast video and the communication video; and superimposing the picture of the broadcast video and the picture of the communication video, according to the layout information for each set of the pictures, and outputting an image in which the picture of the broadcast video and the picture of the communication video are superimposed, the pictures being held in the plane.

Furthermore, the present invention may be implemented by recording the computer program or the digital signal on a computer-readable recording medium, such as a flexible disk, a hard disk, a CD-ROM, an MO, a DVD, a DVD-ROM, a DVD-RAM, and a Blu-ray Disc (BD), and a semiconductor memory.

Furthermore, the present invention may be implemented by transmitting the computer program or the digital signal through a telecommunication line, a wireless or wired communication line, or a network represented by the Internet.

Furthermore, the present invention may be implemented by another independent computer system recording the computer program or the digital signal on the recording medium and transporting the recording medium, or transferring the computer program or the digital signal via the network.

The present invention can be implemented by an LSI that controls the devices according to Embodiments. The functional blocks may be separately made into chips, or a part or an entire thereof may be made into one chip.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. A field-programmable gate array (FPGA) that is programmable after manufacturing an LSI or a reconfigurable processor allowing reconfiguration of the connection or configuration of an LSI can be used for the same purpose.

In the future, with advancement in semiconductor technology, a brand-new technology may replace LSI. The functional blocks and components can be integrated using such a technology. The application of these techniques to biotechnology is one possibility.

Although a recording medium (semiconductor memory, such as HDD, SD card, CompactFlash® is used as a readable and writable recording medium to which stored data is to be transferred, the features of the present invention do not depend on physical characteristics of the recording medium and the present invention is applicable to another readable and writable recording medium. For example, the same advantages can be obviously produced even when data is recorded on, for example, an external removable hard drive.

Although an apparatus having a playback function that superimposes a broadcast content item and a communication content item and plays back the content items is described in each of Embodiments, the present invention is applicable to a device not only having the playback function but also a recording function. Accordingly, Embodiments and Variations may be combined.

INDUSTRIAL APPLICABILITY

The broadcast receiving apparatus according to the present invention produces the advantages of changing a layout of a broadcast content item and a communication content item, and is applicable to, for example, television receivers, playback apparatuses, and mobile devices.

REFERENCE SIGNS LIST 10A to 10F Broadcast receiving apparatus
11a Broadcast content item receiving unit
11b Communication content item receiving unit
12 Layout information obtaining unit
13a First plane
13b Second plane
14 Superimposing unit
14F Output unit
15 Instruction receiving unit
16 Synchronization information obtaining unit
17 Communication state obtaining unit
18 Location information obtaining unit
20, 20a Layout information
21 Synchronization information
101 Broadcast station
102 Server
103 Internet connection
104 TV
104A to 104C Broadcast receiving apparatus
201 Broadcast content item
202 Communication content item
203 Display
301 Tuner
302 Network interface
303 Buffer
304 Buffer
305 Demultiplexer
306 Demultiplexer
307 Image memory
308 Image decoder
309 Video decoder
310 Video decoder
311 Audio decoder
312 Synchronous controller
317 Image plane
314 Video plane
315 Video plane
316 Speaker
317 Adder
318 Scenario memory
319 Current program information item
320 Screen Layout information item
321 Synchronization content information item
322 Control unit
323 Service manager
324 Tuner library
325 Communication library
326 AV playback library
327 Rendering library
328 Remote control manager
401 Program list information
402 PAT
403 PMT
801 Broadcast type
1001 Decoding switch
1002 Superimposing switch
1201 Information on interlocking data
1301 Communication content item
1401 Data type
1402 The number of screens
1403 Video region
1501 Application manager

The invention claimed is:

1. A broadcast receiving apparatus that receives a broadcast content item to be broadcast, the broadcast receiving apparatus comprising:
a communication content item receiving unit configured to receive a communication content item that is distributed through communication other than broadcasting and is related to the broadcast content item;
a broadcast content item receiving unit configured to receive the broadcast content item;
a plane for holding a picture of a broadcast video that is a video represented by the broadcast content item, and a picture of a communication video that is a video represented by the communication content item;
a layout information obtaining unit configured to obtain layout information from outside of the broadcast receiving apparatus, the layout information indicating a layout of the broadcast video and the communication video;
a superimposing unit configured to superimpose the picture of the broadcast video and the picture of the communication video, according to the layout information for each set of the pictures, and output an image in which the picture of the broadcast video and the picture of the communication video are superimposed, the pictures being held in the plane; and
a synchronization information obtaining unit configured to obtain synchronization information from outside of the broadcast receiving apparatus,
wherein the superimposing unit is configured to superimpose the communication video and the broadcast video according to the synchronization information and output an image in which the communication video and the broadcast video are superimposed to synchronize the communication video with the broadcast video,
the synchronization information further indicates a type of the broadcast content item as a broadcast type, and
the superimposing unit is configured to determine whether or not the broadcast content items is to be broadcast live, according to the broadcast type, and prohibit superimposition of the broadcast video and the communication video when determining that the broadcast content item is to be broadcast live.

2. The broadcast receiving apparatus according to claim 1, wherein the layout information indicates a display size and a display position of the broadcast video and a display size and a display position of the communication video to superimpose one of the broadcast video and the communication video at a position except for characterizing portions of the other of the broadcast video and the communication video, when the one is superimposed on the other and smaller than the other, and
the superimposing unit is configured to place the broadcast video and the communication video at the respective display positions with the respective display sizes, the display positions and the display sizes being indicated by the layout information.

3. The broadcast receiving apparatus according to claim 1, wherein the layout information indicates a first layout and a second layout,
the broadcast receiving apparatus further comprises an instruction receiving unit configured to receive an instruction of a layout,
the superimposing unit is configured to:
superimpose the communication video on the broadcast video according to the first layout and output an image of the broadcast video on which the communication video is superimposed, when the instruction receiving unit receives an instruction of the first layout; and superimpose the broadcast video on the communication video according to the second layout and output an image of the communication video on which the broadcast video is superimposed, when the instruction receiving unit receives an instruction of the second layout.

4. The broadcast receiving apparatus according to claim 1, wherein the plane includes a first plane for holding one of the picture of the broadcast video and the picture of the communication video, and a second plane for holding the other of the picture of the broadcast video and the picture of the communication video, and the superimposing unit is configured to switch a plane for holding each of the picture of the broadcast video and the picture of the communication video between the first plane and the second plane to place the communication video in front of or behind the broadcast video.

5. The broadcast receiving apparatus according to claim 1, wherein the synchronization information indicates, in association with each other, a playback position in the communication content item and a playback time at which data at the playback position is to be played back, and the superimposing unit is configured to superimpose, at the playback time indicated by the synchronization information, (i) the picture of the communication video at the playback position indicated in association with the playback time and (ii) the picture of the broadcast video, and output the image in which the picture of the broadcast video and the picture of the communication video are superimposed.

6. The broadcast receiving apparatus according to claim 1, wherein the synchronization information further includes still image identification information for identifying a still image, and the superimposing unit is configured to superimpose the still image identified by the still image identification information, the broadcast video, and the communication video, and output an image in which the still image, the broadcast video, and the communication video are superimposed.

7. The broadcast receiving apparatus according to claim 1, wherein the superimposing unit is configured to output the broadcast video without superimposing the communication video, when the communication content item receiving unit does not receive the communication content item.

8. The broadcast receiving apparatus according to claim 1, wherein the superimposing unit is configured to:

enlarge a display size of the broadcast video to a display size of a display panel, when the communication content item receiving unit is not in a state of receiving the communication content item, in the case where the communication video is displayed on the entirety of the display panel, while the broadcast video is superimposed on the communication video with a size smaller than the display size of the display panel; and reduce the display size of the broadcast video to be smaller than the display size of the display panel, when the communication content item receiving unit is in the state of receiving the communication content item.

9. The broadcast receiving apparatus according to claim 1, further comprising a communication state obtaining unit configured to obtain communication state information indicating a communication state other than the broadcasting, wherein the communication content item receiving unit is configured to receive the communication content having quality that matches the communication state indicated by the communication state information, from among a plurality of communication content items related to the broadcast content item.

10. The broadcast receiving apparatus according to claim 9, wherein bit rates or resolutions of the communication content items are different from each other, and the communication content item receiving unit is configured to receive one of the communication content items having a bit rate or a resolution that matches the communication state indicated by the communication state information.

11. The broadcast receiving apparatus according to claim 1, further comprising a communication state obtaining unit configured to obtain communication state information indicating a communication state other than the broadcasting, wherein the superimposing unit is configured to output the broadcast video without superimposing the communication video, when an index value indicating the communication state indicated by communication state information is higher or lower than a predetermined value.

12. The broadcast receiving apparatus according to claim 1, wherein the superimposing unit is configured to:

consecutively output, within a unit of time, (i) a broadcast picture that is the picture included in the broadcast video and (ii) a communication picture that is the picture included in the communication video and is stereoscopically viewed in pair with the broadcast picture, without superimposing the broadcast picture and the communication picture, when the broadcast video and the communication video are videos which are stereoscopically viewed by being visually recognized by respective eyes and each of which includes pictures; and output the broadcast picture within the unit of time twice consecutively, when the communication content item receiving unit does not receive the communication picture.

13. The broadcast receiving apparatus according to claim 1, wherein the communication content item receiving unit is configured to receive another communication content item related to a part of the broadcast content item, the part being received by the broadcast content item receiving unit after a communication state other than the broadcasting is switched from a reception capable state in which the communication content item can be received to a state in which the communication content item cannot be received, and is back to the reception capable state, while the broadcast content item receiving unit receives the broadcast content item, and the superimposing unit is configured to superimpose the broadcast video and the other communication video according to the layout information, and output an image in which the broadcast video and the other communication video are superimposed.

14. The broadcast receiving apparatus according to claim 1, further comprising a location information obtaining unit configured to obtain location information indicating a location of another communication content item representing a video of a continuation of the broadcast content item, wherein the communication content item receiving unit is configured to receive the other communication content item from the location indicated by the location information, when the broadcast content item receiving unit finishes receiving the broadcast content item, and the superimposing unit is configured to output the other communication content item after the broadcast content item receiving unit finishes receiving the broadcast content item.

15. A broadcast receiving apparatus that receives a broadcast content item to be broadcast, the broadcast receiving apparatus comprising:

a communication content item receiving unit configured to receive a communication content item that is distributed through communication other than broadcasting and is related to the broadcast content item;

a broadcast content item receiving unit configured to receive the broadcast content item;

a plane for holding a picture of a broadcast video that is a video represented by the broadcast content item, and a picture of a communication video that is a video represented by the communication content item;

a layout information obtaining unit configured to obtain layout information from outside of the broadcast receiving apparatus, the layout information indicating a layout of the broadcast video and the communication video;

a superimposing unit configured to superimpose the picture of the broadcast video and the picture of the communication video, according to the layout information for each set of the pictures and output an image in which the picture of the broadcast video and the picture of the communication video are superimposed, the pictures being held in the plane; and a location information obtaining unit configured to obtain location information indicating a location of the communication content item representing the communication video identical to the broadcast video, wherein the communication content item receiving unit is configured to receive the communication content item from the location indicated by the location information, upon receipt of an operation from a user after the broadcast content item receiving unit starts receiving the broadcast content item, the superimposing unit is configured to start outputting the broadcast video when the broadcast content item receiving unit starts receiving the broadcast content item, and superimpose, according to the layout information, the broadcast video and the communication video indicated from the beginning of the communication content item and output an image in which the broadcast video and the communication video are superimposed when the communication content item receiving unit starts receiving the communication content item, and the superimposing unit is configured to:

output the communication video of the communication content item to be played back at a fast speed until an image currently displayed in the broadcast video becomes identical to an image currently displayed in the communication video; and output the communication video of the communication content item to be played back at a normal speed when the image currently displayed in the broadcast video is identical to the image currently displayed in the communication video.

16. A broadcast receiving method in which a broadcast receiving apparatus receives a broadcast content item to be broadcast, the broadcast receiving method comprising:

receiving a communication content item that is distributed through communication other than broadcasting and is related to the broadcast content item;

receiving the broadcast content item;

holding, in a plane, a picture of a broadcast video that is a video represented by the broadcast content item, and a picture of a communication video that is a video represented by the communication content item;

obtaining layout information from outside of the broadcast receiving apparatus, the layout information indicating a layout of the broadcast video and the communication video; and superimposing the picture of the broadcast video and the picture of the communication video, according to the layout information for each set of the pictures, and outputting an image in which the picture of the broadcast video and the picture of the communication video are superimposed, the pictures being held in the plane; and obtaining synchronization information from outside of the broadcast receiving apparatus, wherein the superimposing step superimposes the communication video and the broadcast video according to the synchronization information and outputs an image in which the communication video and the broadcast video are superimposed to synchronize the communication video with the broadcast video, the synchronization information further indicates a type of the broadcast content item as a broadcast type, and the superimposing step determines whether or not the broadcast content item is to be broadcast live, according to the broadcast type, and prohibits superimposition of the broadcast video and the communication video when determining that the broadcast content item is to be broadcast live.

17. A non-transitory computer-readable recording medium on which a program for a broadcast receiving apparatus to receive a broadcast content item to be broadcast, is recorded the program causing a computer to execute:

receiving a communication content item that is distributed through communication other than broadcasting and is related to the broadcast content item;

receiving the broadcast content item;

holding, in a plane, a picture of a broadcast video that is a video represented by the broadcast content item, and a picture of a communication video that is a video represented by the communication content item;

obtaining layout information from outside of the broadcast receiving apparatus, the layout information indicating a layout of the broadcast video and the communication video; and superimposing the picture of the broadcast video and the picture of the communication video, according to the layout information for each set of the pictures, and outputting an image in which the picture of the broadcast video and the picture of the communication video are superimposed, the pictures being held in the plane; and obtaining synchronization information from outside of the broadcast receiving apparatus, wherein the superimposing step superimposes the communication video and the broadcast video according to the synchronization information and outputs an image in which the communication video and the broadcast video are superimposed to synchronize the communication video with the broadcast video, the synchronization information further indicates a type of the broadcast content item as a broadcast type, and the superimposing step determines whether or not the broadcast content item is to be broadcast live, according to the broadcast type, and prohibits superimposition of the broadcast video and the communication video when determining that the broadcast content item is to be broadcast live.

18. The broadcast receiving apparatus according to claim 15,
wherein the superimposing unit is configured to enlarge the communication video to be displayed on the entirety of a display panel and output the enlarged communication video, instead of superimposition of the broadcast video and the communication video.

19. A broadcast receiving method in which a broadcast receiving apparatus receives a broadcast content item to be broadcast, the broadcast receiving method comprising:
receiving a communication content item that is distributed through communication other than broadcasting and is related to the broadcast content item;
receiving the broadcast content item;
holding, in a plane, a picture of a broadcast video that is a video represented by the broadcast content item, and a picture of a communication video that is a video represented by the communication content item;
obtaining layout information from outside of the broadcast receiving apparatus, the layout information indicating a layout of the broadcast video and the communication video;
superimposing the picture of the broadcast video and the picture of the communication video, according to the layout information for each set of the pictures, and outputting an image in which the picture of the broadcast video and the picture of the communication video are superimposed, the pictures being held in the plane; and
obtaining location information indicating a location of the communication content item representing the communication video identical to the broadcast video,
wherein the communication content item receiving step receives the communication content item from the location indicated by the location information, upon receipt of an operation from a user after the broadcast content item receiving step starts receiving the broadcast content item,
the superimposing step starts outputting the broadcast video when the broadcast content item receiving step starts receiving the broadcast content item, and superimposes, according to the layout information, the broadcast video and the communication video indicated from the beginning of the communication content item and outputs an image in which the broadcast video and the communication video are superimposed when the communication content item receiving step starts receiving the communication content item, and
the superimposing step:
outputs the communication video of the communication content item to be played back at a fast speed until an image currently displayed in the broadcast video becomes identical to an image currently displayed in the communication video; and
outputs the communication video of the communication content item to be played back at a normal speed when the image currently displayed in the broadcast video is identical to the image currently displayed in the communication video.

20. A non-transitory computer-readable recording medium on which a program for a broadcast receiving apparatus to receive a broadcast content item to be broadcast, is recorded the program causing a computer to execute:
receiving a communication content item that is distributed through communication other than broadcasting and is related to the broadcast content item;
receiving the broadcast content item;
holding, in a plane, a picture of a broadcast video that is a video represented by the broadcast content item, and a picture of a communication video that is a video represented by the communication content item;
obtaining layout information from outside of the broadcast receiving apparatus, the layout information indicating a layout of the broadcast video and the communication video;
superimposing the picture of the broadcast video and the picture of the communication video, according to the layout information for each set of the pictures, and outputting an image in which the picture of the broadcast video and the picture of the communication video are superimposed, the pictures being held in the plane; and
obtaining location information indicating a location of the communication content item representing the communication video identical to the broadcast video,
wherein the communication content item receiving step receives the communication content item from the location indicated by the location information, upon receipt of an operation from a user after the broadcast content item receiving step starts receiving the broadcast content item,
the superimposing step starts outputting the broadcast video when the broadcast content item receiving step starts receiving the broadcast content item, and superimposes, according to the layout information, the broadcast video and the communication video indicated from the beginning of the communication content item and outputs an image in which the broadcast video and the communication video are superimposed when the communication content item receiving step starts receiving the communication content item, and
the superimposing step:
outputs the communication video of the communication content item to be played back at a fast speed until an image currently displayed in the broadcast video becomes identical to an image currently displayed in the communication video; and
outputs the communication video of the communication content item to be played back at a normal speed when the image currently displayed in the broadcast video is identical to the image currently displayed in the communication video.

* * * * *